United States Patent
Shende et al.

(10) Patent No.: US 11,996,222 B2
(45) Date of Patent: May 28, 2024

(54) THERMALLY STABILIZED REDOX MATERIALS AND APPLICATIONS THEREOF

(71) Applicant: South Dakota Board of Regents, Pierre, SD (US)

(72) Inventors: Rajesh V. Shende, Rapid City, SD (US); Jan A. Puszynski, Rapid City, SD (US); Vinod S. Amar, Rapid City, SD (US)

(73) Assignee: SOUTH DAKOTA BOARD OF REGENTS, Pierre, SD (US)

(\*) Notice: Subject to any disclaimer, the term of this patent is extended or adjusted under 35 U.S.C. 154(b) by 673 days.

(21) Appl. No.: 16/294,656

(22) Filed: Mar. 6, 2019

(65) Prior Publication Data
US 2019/0206599 A1 Jul. 4, 2019

Related U.S. Application Data

(63) Continuation of application No. PCT/US2016/050528, filed on Sep. 7, 2016.

(51) Int. Cl.
*H01F 1/36* (2006.01)
*B82Y 25/00* (2011.01)
(Continued)

(52) U.S. Cl.
CPC .......... *H01F 1/36* (2013.01); *C01B 3/06* (2013.01); *B82Y 25/00* (2013.01); *B82Y 40/00* (2013.01); *Y02E 60/36* (2013.01)

(58) Field of Classification Search
CPC .............. H01F 1/36; C01B 3/06; B82Y 40/00
(Continued)

(56) References Cited

U.S. PATENT DOCUMENTS

| 5,906,768 A | 5/1999 | Kakinuma et al. |
| 6,033,594 A | 3/2000 | Enokido et al. |

(Continued)

FOREIGN PATENT DOCUMENTS

| CN | 101236819 B | 8/2010 |
| CN | 102390989 B | 5/2013 |

(Continued)

OTHER PUBLICATIONS

Preparation and Characterization of Nickel Ferrite-SiO2/Ag Core/Shell Nanocomposites I. G. Blanco-Esqueda et al Adv. in Mater. Sci. and Eng. V 2015, pp. 1-7 (Year: 2015).*
(Continued)

*Primary Examiner* — Coris Fung
(74) *Attorney, Agent, or Firm* — Goodhue, Coleman & Owens, P.C.

(57) ABSTRACT

The present disclosure addresses limitations in ferritic materials. In at least one aspect, the present disclosure provides core-shell nanoparticles exhibiting improved characteristics for implementations and adoptability in numerous applications. Further aspects of the disclosure provide core-shell nanoparticles for use in electronic, magnetic and electromagnetic applications. Still, other aspects of the present disclosure provide core-shell nanoparticles for a thermochemical water-splitting reaction resulting in increased $H_2$ volume generation during multiple thermochemical cycles.

15 Claims, 29 Drawing Sheets

(51) Int. Cl.
*B82Y 40/00* (2011.01)
*C01B 3/06* (2006.01)

(58) Field of Classification Search
USPC .......................................................... 423/657
See application file for complete search history.

(56) References Cited

U.S. PATENT DOCUMENTS

| | | | |
|---|---|---|---|
| 6,402,979 | B1 | 6/2002 | Saita et al. |
| 6,741,154 | B2 | 5/2004 | Kawasaki et al. |
| 7,422,697 | B2 | 9/2008 | Takahashi et al. |
| 7,951,741 | B2 * | 5/2011 | Eijsbouts ............. B01J 37/0018 502/313 |
| 8,597,534 | B2 | 12/2013 | An et al. |
| 2004/0051075 | A1 | 3/2004 | Aoki et al. |
| 2005/0007232 | A1 | 1/2005 | Ono et al. |
| 2010/0181522 | A1 | 7/2010 | Kim et al. |
| 2013/0266502 | A1 * | 10/2013 | Lichty .................... C01B 3/061 422/600 |
| 2013/0310605 | A1 * | 11/2013 | Salem ................... C07C 51/377 562/592 |
| 2015/0228395 | A1 | 8/2015 | Ochiai et al. |
| 2016/0155560 | A1 | 6/2016 | Lee et al. |
| 2018/0022615 | A1 * | 1/2018 | Sponchia .............. A61K 9/143 424/489 |

FOREIGN PATENT DOCUMENTS

| | | |
|---|---|---|
| CN | 103556184 B | 1/2016 |
| CN | 104051113 B | 6/2016 |
| CN | 104051108 B | 8/2016 |
| WO | 2014003061 A1 | 1/2014 |
| WO | 2015107456 A1 | 7/2015 |
| WO | WO2016120795 * | 8/2016 |

OTHER PUBLICATIONS

Effect of water-based sol gel method on structural, thermal and conductivity properties of LiNO3—Al2O3 composite solid electrolytes M. Sulaiman et al. Arabian Journal of Chemistry, v10, pp. 1147-1152 (Year: 2017).*

Amar, VS et al. H2 generation from thermochemical water-splitting using yttria stabilized NiFe2O4 core-shell nanoparticles. Journal of Renewable and Sustainable Energy. Mar. 1, 2015. vol 7. No. 2; pp. 023113-1 through 023113-8.

Bhosale, RR et al. "Sol-gel derived NiFe2O4 modified with ZrO2 for hydrogen generation from solar thermochemical water-splitting reaction." In MRS Proceedings. Cambridge University Press. 2012. vol. 1387, second and fourth pages.

Choudhar, RNP et al. "Structural and dielectric properties of mechanochemically synthesized BiFeO3—Ba (Zr0.6Ti0.4)O3 solid solutions." Materials Chemistry and Physics. Oct. 15, 2007. vol. 105. No. 2; pp. 286-287.

International Search Report & Written Opnion, PCT/US16/50528, 15 Pages, dated Jan. 13, 2017.

Magnetic Materials Producers Association, "Introduction to Soft Ferrites", 1998, 44 pages.

Schaller, "Ferrite Processing & Effects on Material Performance", pp. 87-90, 1988.

International Preliminary Report on Patentability, PCT/US16/50528, dated Mar. 21, 2019, 8 Pages.

* cited by examiner

THERMALLY STABILIZED REDOX MATERIALS AND APPLICATIONS THEREOF

CROSS-REFERENCE TO RELATED APPLICATIONS

This application is a continuation of International Application No PCT/US16/50528, filed Sep. 7, 2016, which is incorporated by reference in their entirety.

GRANT REFERENCE

This disclosure was made with government support under grant number CBET #1134570 by the National Science Foundation. The government has certain rights in the disclosure.

BACKGROUND

I. Field of the Disclosure

Novel products, methods, and systems using thermally stabilized redox materials and their applications are disclosed. More particularly, but not exclusively, novel products, methods and systems are disclosed using ferrite materials, or more generically, ceramic compounds where iron oxide is chemically combined with metallic elements to enhance ferrites developed, by way of example, for their magnetic properties, electrical properties and $H_2$ generation capacity.

II. Description of the Prior Art

Ferrite materials are ferromagnetic (electrically non-conductive) and used for a variety of applications, which range from electro-magnets for devices such as refrigerators, small electric motors, and loudspeakers to inductors, transformers, microwaves, and other electronic industry components. Other uses include applications in thermochemical water-splitting technologies. Still, further uses applications contemplate general use in electronics, magnetics and electro-magnetics. Unique applications, such as thermochemical water-splitting exist as do other unique applications. Limitations in these and other non-enumerated areas have and do continue to exist with the current materials and approaches.

SUMMARY

Therefore, what is needed are novel products, methods, and systems using thermally stabilized redox materials and their resulting applications.

According to at least one exemplary aspect, a method for core-shell nanoparticles is disclosed. The method uses, in at least one aspect, sol-gel derived ferrite nanoparticles from $NiCl_2$ and $FeCl_2$ precursors. The ferrite nanoparticles are dispersed in surfactant thereby forming a first dispersion and a copolymer surfactant is added to the first dispersion. A composition is formed by introducing a second dispersion into the first dispersion, wherein the second dispersion has a surfactant and a precursor including at least one of Y and Zr. The viscosity of the composition is increased by adding one or more organic compounds. Calcining the composition at one or more temperatures for one or more time periods forms the core-shell nanoparticles. In a preferred form, the method includes core-shell nanoparticles comprising $NiFe_2O_4/Y_2O_3$ nanoparticles. In another preferred form, the method includes core-shell nanoparticles comprising $NiFe_2O_4/ZrO_2$ nanoparticles.

According to another exemplary aspect, core-shell nanoparticles are disclosed. The core-shell nanoparticles are sol-gel derived ferrite nanoparticles from $NiCl_2$ and $FeCl_2$ precursors. A first dispersion can be formed from the ferrite nanoparticles in surfactant. The first dispersion can include one or more copolymer surfactants. A composition can be formed from combining a second dispersion with the first dispersion, wherein the second dispersion includes a surfactant and a precursor including at least one of Y and Zr. A desired composition with a preferred viscosity can be formed the addition of one or more organic compounds. In a preferred form, the composition can be calcined at one or more temperatures for one or more time periods for forming the core-shell nanoparticles.

According to at least one other exemplary aspect, a ferrite core for magnetic and electrical applications is disclosed. The ferrite core includes sol-gel derived ferrite nanoparticles from $NiCl_2$ and $FeCl_2$ precursors forming a first dispersion. A surfactant and a precursor including at least one of Y and Zr form a second dispersion. Core-shell nanoparticles form from the combination of the first and second dispersion. A sintered core can be formed from the core-shell nanoparticles. A coating of one or more electrically conductive materials can be applied to the core-shell nanoparticles for measuring magnetic and electrical properties of the core-shell nanoparticles.

According to at least one other exemplary aspect, a magnetic, electronic and electro-magnetic device with core-shell nanoparticles is disclosed.

According to another exemplary aspect, a thermochemical water-splitting reactor wherein at least one of the one or more of the $H_2$ generating materials comprise core-shell redox nanoparticles is disclosed.

According to at least one other exemplary aspect, a method for $H_2$ volume generation is disclosed. The method uses, in at least one aspect, a thermochemical water-splitting reactor. One or more $H_2$ generating materials are introduced into the thermochemical water-splitting reactor, wherein at least one of the one or more of the $H_2$ generating materials comprise core-shell redox nanoparticles. In a preferred aspect, the core-shell redox nanoparticles are produced by a surfactant templating assisted sol-gel process, the nanoparticles comprise ferrite nanoparticles and core-shell comprises a ceramic.

According to at least another exemplary aspect, a thermally stable redox material for $H_2$ volume generation is disclosed. The material comprises redox nanoparticles having a core-shell morphology, wherein the core-shell inhibits grain growth and particle sintering of the nanoparticles. In a preferred form, the nanoparticles comprise ferrite nanoparticles and the core-shell comprises a ceramic.

According to at least one other exemplary aspect, a thermally stable redox material for $H_2$ volume generation is disclosed. The material can include redox particles, both nano as well as submicron, made up of refractory ceramic based ferrite.

According to at least one other exemplary aspect, a thermally stable redox material for $H_2$ volume generation is disclosed. The material can include redox particles immobilized on ceramic structures (e.g., yttrium stabilized zirconia, YSZ).

BRIEF DESCRIPTION OF THE DRAWINGS

Illustrated embodiments of the disclosure are described in detail below with reference to the attached drawing figures, which are incorporated by reference herein, and where.

BRIEF DESCRIPTION OF THE TABLES

Figure 1:
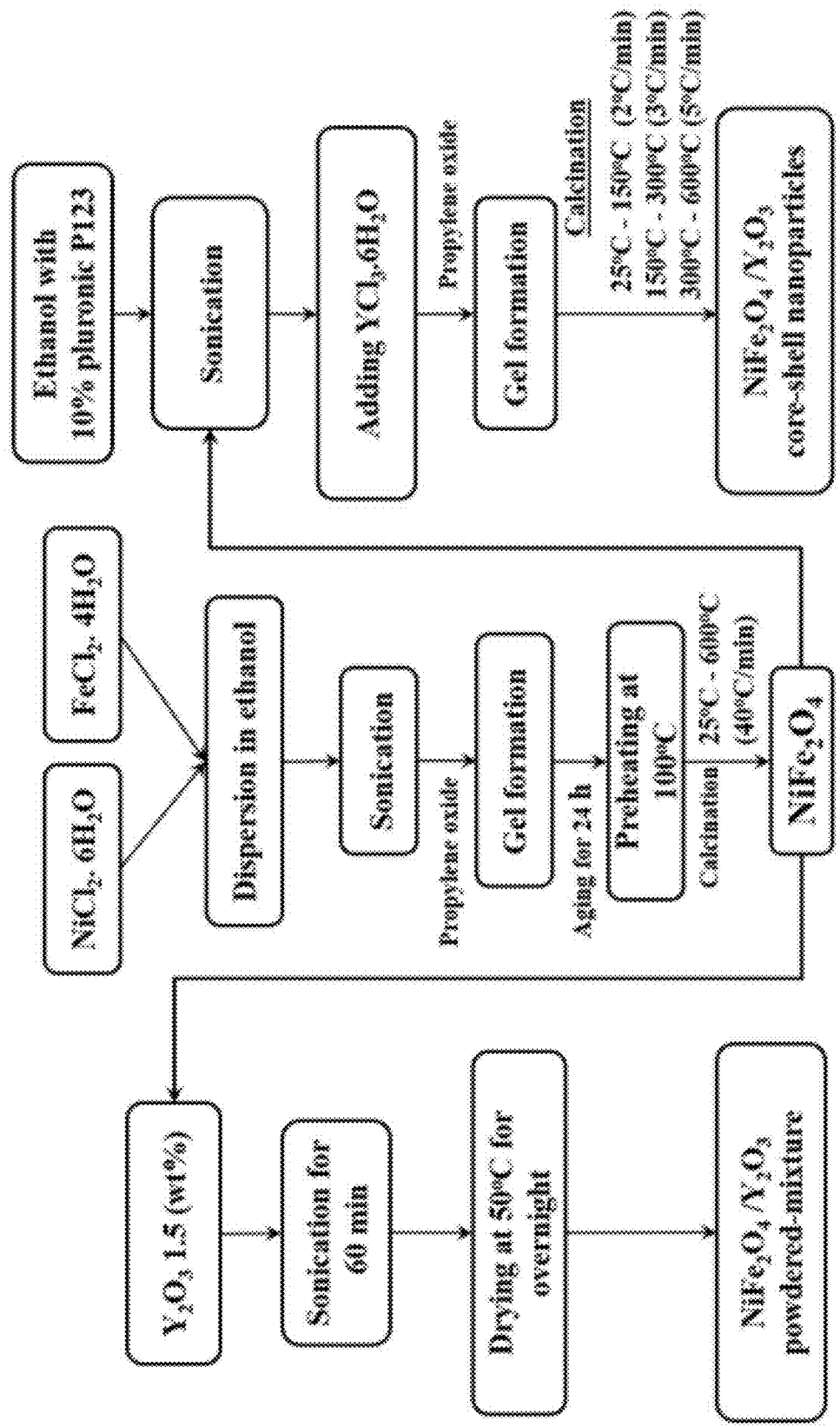
FIG. 1 is an exemplary synthesis process for $NiFe_2O_4$, $NiFe_2O_4/Y_2O_3$ core-shell nanoparticles and $NiFe_2O_4/Y_2O_3$ powdered mixture core-shell nanoparticles in accordance with an illustrative aspect of the present disclosure.

Illustrated embodiments of the disclosure are described in detail below with reference to the attached Tables, which are incorporated by reference herein, and where:

Table 1: Listing of contemplated ferritic materials of the present disclosure;

Table 2: $H_2$ and $O2$ volumes produced during 25 thermochemical cycles using yttrium ferrite; and Table 3: $H_2$ and $O2$ volumes produced during 25 thermochemical cycles using yttrium ferrite under isothermal conditions.

DETAILED DESCRIPTION

1. Introduction

The present disclosure is directed to novel products, methods, and systems using thermally stabilized redox materials and their applications. The ferritic materials of the present disclosure exhibit properties suitable for a wide range of applications. The disclosure also contemplates, amongst other applications, unique ferrite materials prepared for applications in at least the electrical, magnetic and electromagnetic industries; and to this end, the creation of a ferritic core of desired dimensions using sol-gel derived soft ferrites of the present disclosure. Also presented are ferritic materials exhibiting desired parameters, such as element composition, phase and microstructure, acquired by standard test procedures for the measurement of different properties, which can include initial permeability, flux density, remanence, coercivity, core loss, curing temperature, electrical resistivity and density. Ferrites of the present disclosure can be characterized by x-ray diffraction and scanning electron microscopy/energy dispersive spectroscopy (SEM/EDX) to understand phase composition and microstructural defects. In at least one exemplary aspect, toroidal cores are obtained by ferrite powders either dry pressed or mold casted and sintered to achieve desired geometries. The ferritic materials of the present disclosure are also proven to exhibit significant improvements in efficient $H_2$ generation using a thermochemical water-splitting process. These and other applications leveraging the ferritic materials of the present disclosure are contemplated.

Ferrite materials are ceramic compounds wherein iron oxide is chemically combined with metallic elements. They are ferromagnetic (electrically non-conductive) and used for a variety of applications, which include electro-magnets for the devices such as refrigerators, small electric motors, loudspeakers, etc. In the electronic industry ferrite cores are used for inductors, transformers and microwave components. Soft ferrites can have low coercivity, which means that their magnetization can be reversed without dissipation of energy (hysteresis loss) whereas the material's high resistivity can prevent eddy currents in the core. Low losses typically at higher frequencies find applications in making cores for inductors such as switched mode power supplies, and RF transformers. Examples of soft ferrites are—MnZn ferrite and NiZn ferrite; the former is known to have higher permeability and saturation induction whereas the latter is known to have higher resistivity. Contemplated in the present disclosure are some 35 different ferrites (undoped and doped including MnZn and NiZn ferrites) for use in various applications, including those enumerated herein, which are preferably synthesized by a sol-gel method.

2. Exemplary Materials & Methods

2.1. Synthesis of Ferrites and Core-Shell Ferrites

By way of introduction and according to at least one example, synthesis of doped/undoped ferrites such as those listed in Table 1 can include, by way of a specific example, stoichiometric quantities of $NiCl_2.6H_2O$ and $FeCl_2.4H_2O$ added in 1:2 (w/w) ratio in ethanol and sonicated for 90 min, until a visually clear solution is obtained. To this solution propylene oxide can added to achieve the gel formation. As-synthesized gels can be aged for 24 to 120 hours, dried at 100° C. for 1 hour and finally heated rapidly at the rate of 40° C./min up to different temperatures and quenched in air or $N_2$ environments to achieve a powdered ferrite material.

By way of introduction and according to at least one example, synthesis of core-shell ferrites such as those listed in Table 1 can include, by way of a specific example, synthesis of core-shell ferrites including sol-gel derived Ni-ferrite nanoparticles sonicated for 2 hours in ethanol (e.g., 80 ml) to achieve a dispersion. To this dispersion, pluronic P123 (e.g., 0.5 g in 20 ml ethanol) surfactant can be added and the resultant mixture can again be sonicated for 2 hours. Visually clear $YCl_3.6H_2O$ (0.5 g) solution in ethanol (e.g., 20 ml) can be separately prepared and added dropwise to the Ni-ferrite dispersion and sonicated for 2 hours. Propylene oxide (e.g., 120 ml) can be added to obtain a gel formation. The resultant gel can be aged for 48 hours and preheated at 120° C. for 2 hours and calcined at 600° C. as per the ramp rate shown in FIG. 1.

2.2. Preparation of Ferrite Pellets

Figure 2:
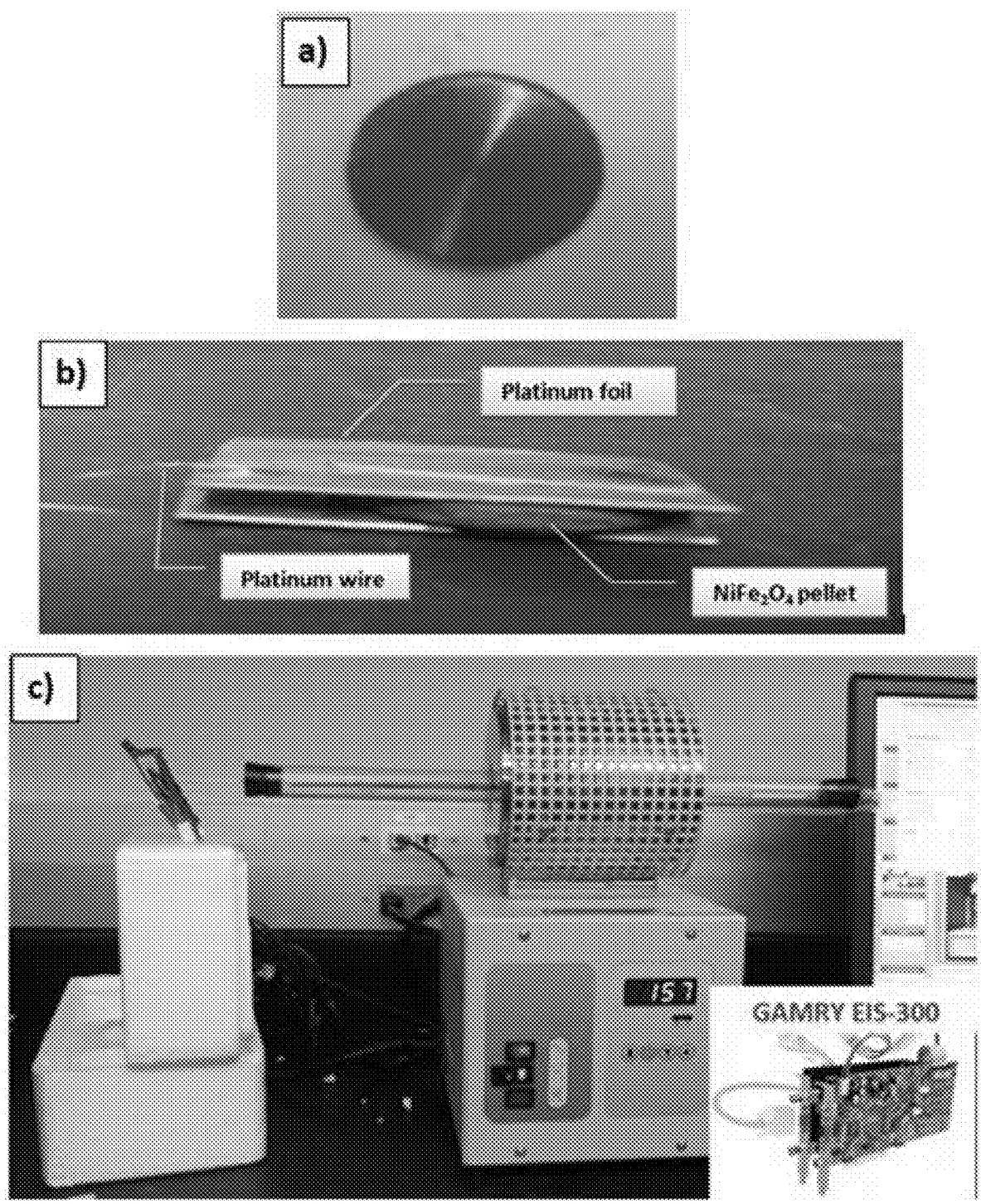
FIG. 2 is an image of an exemplary ferrite pellet coated with a platinum target (a) and high temperature electrochemical impedance spectroscopy (EIS) set-up (b, c) in accordance with an illustrative aspect of the present disclosure.

By way of introduction and according to at least one example, ferrite pellet preparation can include calcined Ferrite powdered materials, such as those listed in Table 1, dry pressed into pellets with an applied pressure of 3500 psi using a Carver hydraulic press. Dimensions of a pellet, as exhibited in FIG. 2, are 18 mm diameter and 2+0.2 mm thickness. The pellets can be sintered at 600° C. for 4 hours. The sintered pellets can also be sputter coated with a platinum target using an Edwards sputter coater. A typical pellet specimen of $ZrO_2$/Ni-ferrite is shown in FIG. 2, along with an exemplary high temperature impedance set-up.

TABLE 1

| | Listing of contemplated ferritic materials of the present disclosure. |
| --- | --- |
| Powdered ferrites (undoped) | Ferrites of the type $M_1Fe_2O_4$ ($M_1$ represents a metal such as Ni, Mn, Zn, Co, Sn, Mg, Li, Cu, Y) |
| Powdered ferrites (doped) | Ferrites of the type $M_{1x}M_{2y}Oz$ (x: 0-1, y: 0-5, z: 4-10; $M_1$ and $M_2$ represent metals such as Ni, Mn, Zn, Co, Sn, Mg, Li, Cu, Y) |
| Powdered mixtures | Ni-ferrite + $ZrO_2$, Ni-ferrite + $Y_2O_3$, Ni-ferrite + YSZ, Ni-ferrite + ceria |
| Core-shell ferrites | Ni-ferrite/$Y_2O_3$, Ni-ferrite/$ZrO_2$, Co-ferrite/$Y_2O_3$, Co-ferrite/$ZrO_2$ |
| Immobilized ferrites | Ni-Ferrite on YSZ, Li-ferrite on YSZ, yttrium garnet on YSZ |

2.3.1 X-Ray Diffraction

In accordance with contemplative aspects of the present disclosure, various techniques for characterizing ferrites of the present disclosure are enumerated. According to one exemplary characterization, ferrite materials can be analyzed by a Rigaku Ultima Plus X-ray diffractometer (e.g., CuK$\alpha$ radiation, $\lambda$=1.5406 Å, 40 kV, 40 mA) and a commercially available graphite monochromator. The parameters such as 2$\theta$, scanning speed and width of $10° \leq 2\theta \leq 80°$, 2° per minute and 0.020°, respectively were used for the X-ray diffraction measurements. Quantitative estimation of the phases present in the powders was performed using the JADE software, v. 7.5 (commercially available from supplier Materials Data Inc.) following the 'Reference Intensity Ratio' (RIR) method.

2.3.2 Scanning and Transmission Electron Microscopy (SEM/TEM)

In accordance with further contemplative aspects of the present disclosure, various techniques for characterizing ferrites of the present disclosure are enumerated. The morphology of the calcined ferrite powders can be analyzed using commercially available equipment, such as for example, a Zeiss Supra 40 VP field-emission scanning electron microscope, a Hitachi H-7000 FA and a JEM-2100 transmission electron microscope. The calcined powders enumerated in Table 1 can be used for the SEM analysis without coating with a conducting material. For the SEM analysis, the EHT (electron high tension) can be used in the range of 1 to 2 kV and with a standard aperture size of 30 µm. Both SE2 (secondary electron-2) and In-Lens detectors can be used for the analysis. For TEM analysis, ferrite nanoparticles can be sonicated in ethanol for 2 hours and this dispersion can be added onto the carbon coated copper grids, which can be further plasma cleaned to remove impurities.

2.3.3 Specific Surface Area (SSA)

In accordance with still further contemplative aspects of the present disclosure, various techniques for characterizing ferrites of the present disclosure are enumerated. Using a micromeritics Gemini II-2375 Brunauer Emmett Teller (BET) specific surface area analyzer, calcined powders can be degassed at 200° C. to determine the SSA.

2.3.4 Electrochemical Impedance Analysis

In accordance with yet further contemplative aspects of the present disclosure, various techniques for characterizing ferrites of the present disclosure are enumerated. According to one exemplary characterization, electrochemical impedance analysis using a commercially available EIS300 tool can be used to measure impedance in the frequency range of 1 mHz to 300 kHz providing impedance values of 1 mΩ to 1013Ω. Oxygen diffusivity in solids can be estimated using a powerful electrochemical impedance spectroscopy (EIS) measurement technique. Using this tool, DC voltage of ±8 volts and AC voltage of about 3600 mV rms can be applied to the sample. Commercially available 'Echem analyst' software can be used for the data analysis. To measure impedance of a pellet specimen, a set-up can be designed and built. In the set-up, the EIS300 tool can be interfaced with a computer. A coated pellet specimen can be sandwiched between two platinum disc electrodes and connected with platinum wires to the EIS300 terminals and finally placed inside a quartz tube. The assembly can be kept inside a Carbolite furnace capable of providing temperatures up to 1100° C. and impedance measurements can be performed.

2.4 Results and Discussion

Figure 3:
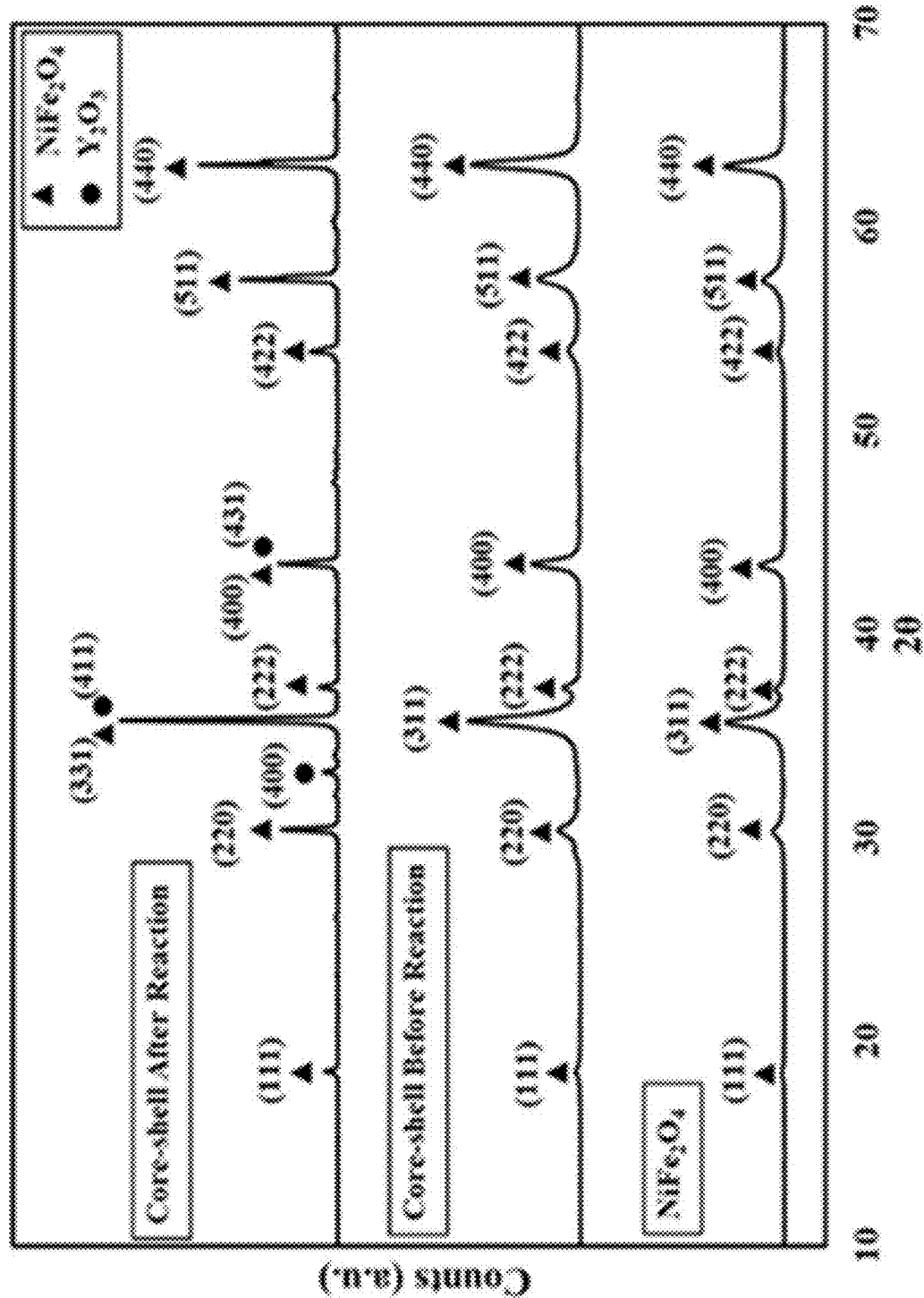
FIG. 3 is a pictorial representation of XRD patterns of $NiFe_2O_4$, $NiFe_2O_4/Y_2O_3$ core-shell nanoparticles before and after thermochemical water-splitting reaction in accordance with an illustrative aspect of the present disclosure.

2.4.1 Exemplary Application: Use in Thermochemical Water-Splitting Reaction Sol gel derived Ni-ferrite and core-shell ferrite nanoparticles can be characterized by XRD and the profiles obtained are shown in FIG. 3. The 2θ reflections corresponding to 32.32°, 35.70°, 37.32°, 43.38°, 53.92°, 57.36° and 63° indicate nominally phase pure composition of $NiFe_2O_4$. Similarly, from the XRD pattern of core-shell material, Ni-ferrite and $Y_2O_3$ phases can be determined. When core-shell nanoparticles are subjected to, by way of example, thermochemical water-splitting at 900°-1000° C. and analyzed; their XRD pattern revealed additional 2θ reflection of characteristic $Y_2O_3$ at 33.86°. The intensity of major 2θ reflections corresponding to $Y_2O_3$ is found to be higher indicating crystallization of $Y_2O_3$ in core-shell nanoparticles after high temperature thermochemical water-splitting reaction.

Figure 4:
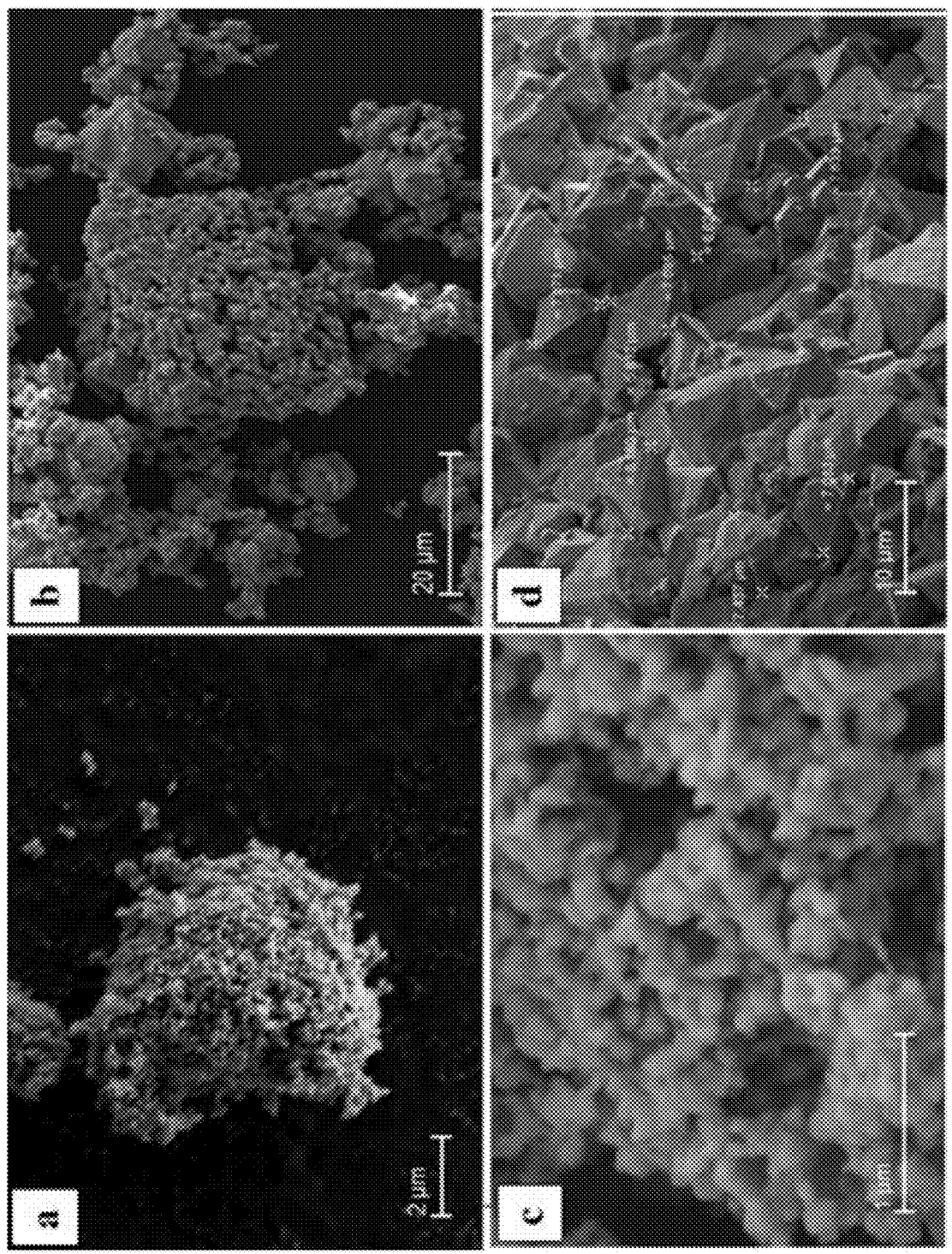
FIG. 4 is a pictorial representation of SEM images of as synthesized nanoparticles (a, c) and after thermochemical water-splitting reaction (b, d) of $NiFe_2O_4/Y_2O_3$ core-shell and $NiFe_2O_4$ nanoparticles in accordance with an illustrative aspect of the present disclosure.
Figure 5:
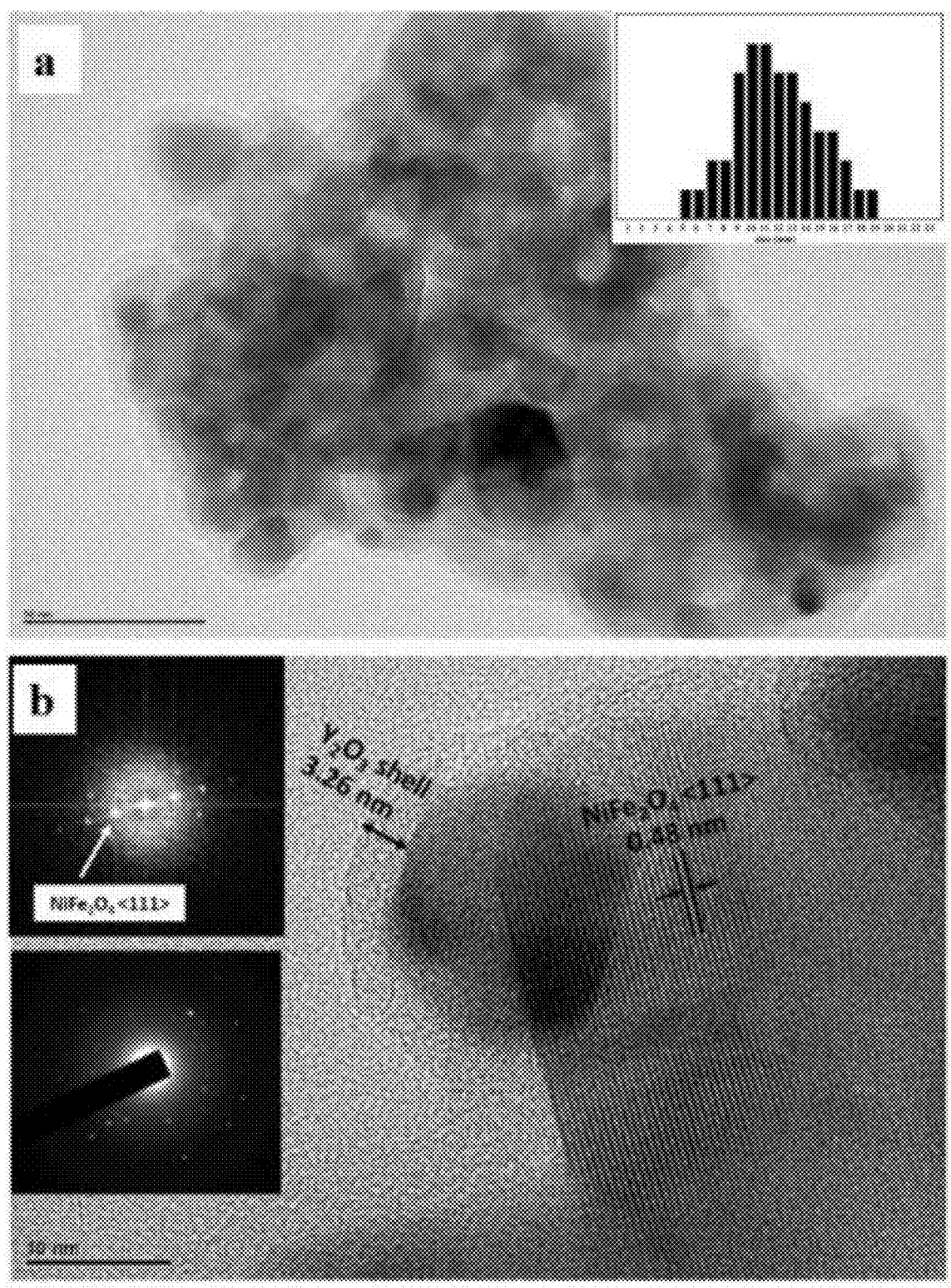
FIG. 5 is a pictorial representation of TEM images showing agglomerated core-shell nanoparticles with particle size distribution in image (a) and core-shell $NiFe_2O_4/Y_2O_3$ morphology with atomic fringes in image (b) in accordance with an illustrative aspect of the present disclosure.

SEM images of as-synthesized core-shell nanoparticles and $NiFe_2O_4$ nanoparticles are shown in FIGS. 4(a) and 4(c), respectively, which show sub-micron size amorphous particles/grains with somewhat spherical morphology. After thermochemical water-splitting reaction, the SEM image of $NiFe_2O_4$ (FIG. 4(d)) showed significant grain growth with particles size of 2-10 µm and these particles are found to have faceted grain surfaces. Contrasting these exhibited characteristics, the grain growth appears to be smaller in the SEM image of core-shell ferrite nanoparticles as shown in FIG. 4(b). TEM images of core-shell ferrite nanoparticles are shown in FIG. 5. Almost all particles exhibit core-shell morphology, however the nanoparticles are found to be agglomerated mostly within a single shell as shown in FIG. 5(a). Agglomeration of ferrite nanoparticles is likely due to their magnetic nature. The core particle size distribution presented as an inset in FIG. 5(a) indicates particle size ranging from 5-19 nm with average particle size of ~12 nm. A detailed TEM image of a single core-shell nanoparticle with atomic fringes and Fast Fourier Transform (FFT) analysis are shown in FIG. 5(b). The d-spacing of core material of 0.48 nm evidently confirmed $NiFe_2O_4$ oriented along <111> plane, which is consistent with the d-spacing reported in the literature for $NiFe_2O_4$. The TEM image (FIG. 5(b)) further reveals the shell thickness of 3.26 nm in the core-shell nanoparticle.

Figure 6:
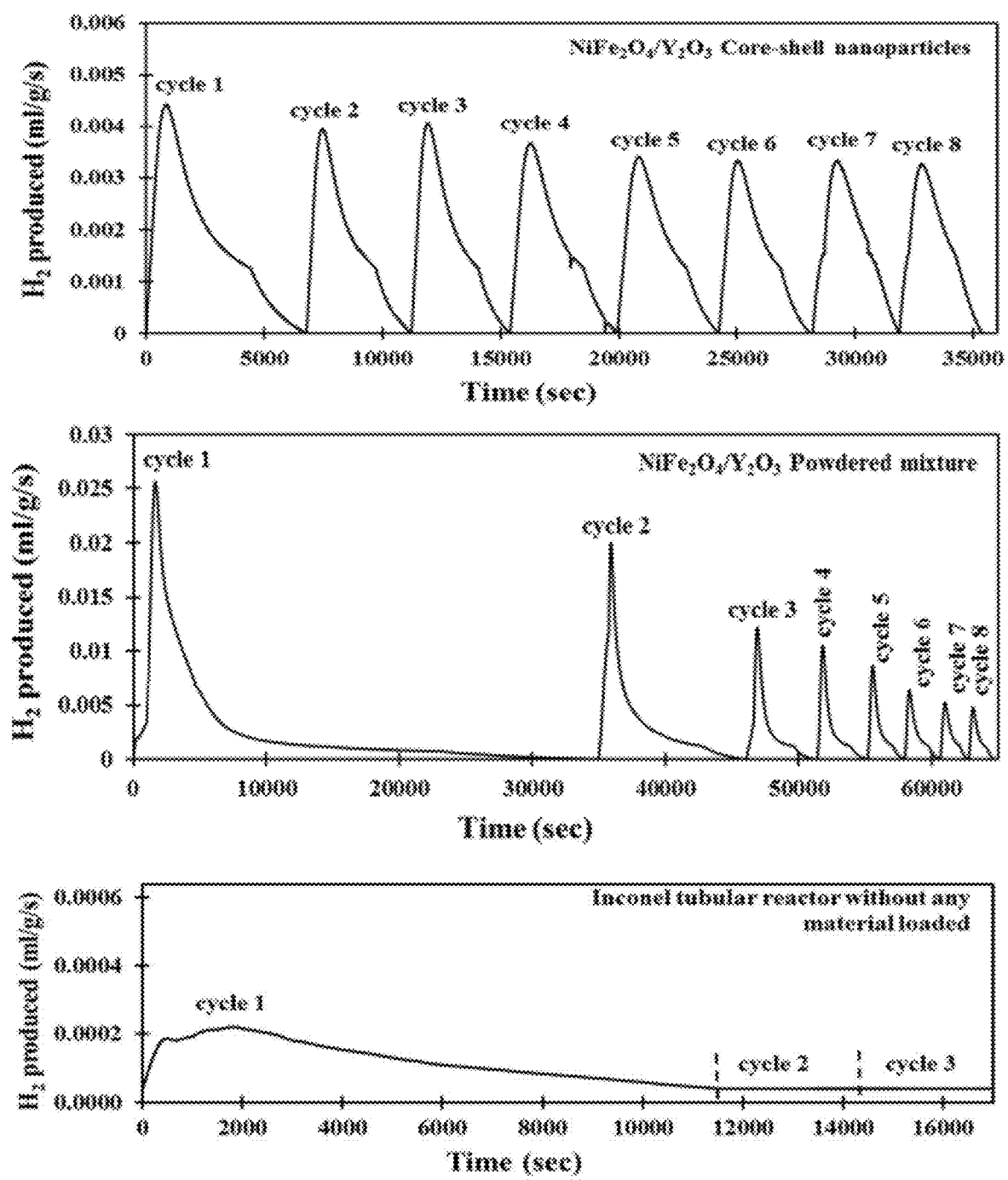
FIG. 6 is a pictorial representation of transient $H_2$ profiles obtained with an Inconel reactor alone (wall effect) and during eight thermochemical cycles for $NiFe_2O_4/Y_2O_3$ core-shell nanoparticles and $NiFe_2O_4/Y_2O_3$ powdered mixtures and with water splitting and regeneration steps performed at 900° C. and 1100° C. respectively in accordance with an illustrative aspect of the present disclosure.
Figure 7:
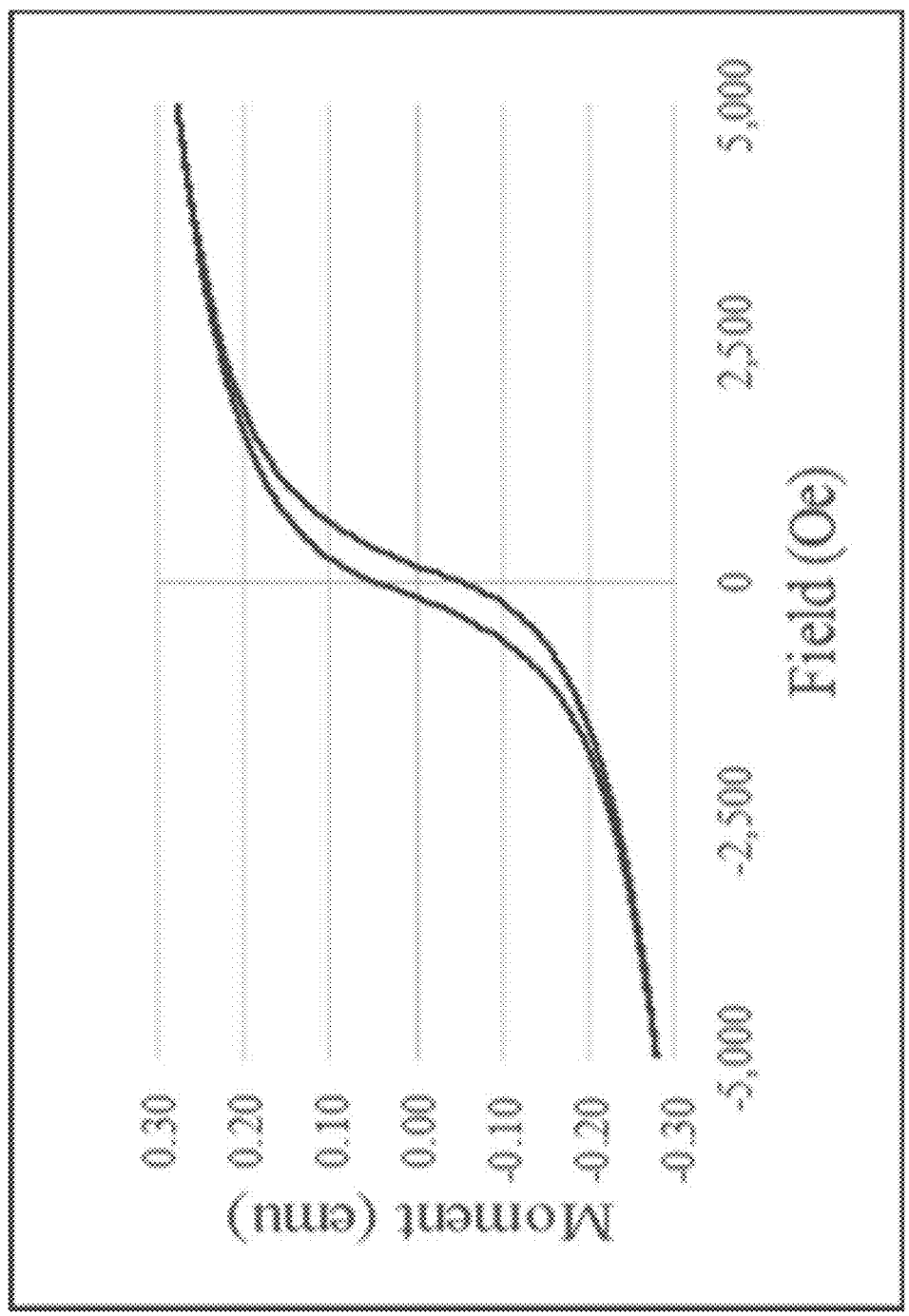
FIGS. 7-10 is a pictorial representation of First-Order-Reversal-Curve (FORC) measurements of sol-gel derived $NiFe_2O_4$ and Y-ferrite in accordance with an illustrative aspect of the present disclosure.
Figure 8:
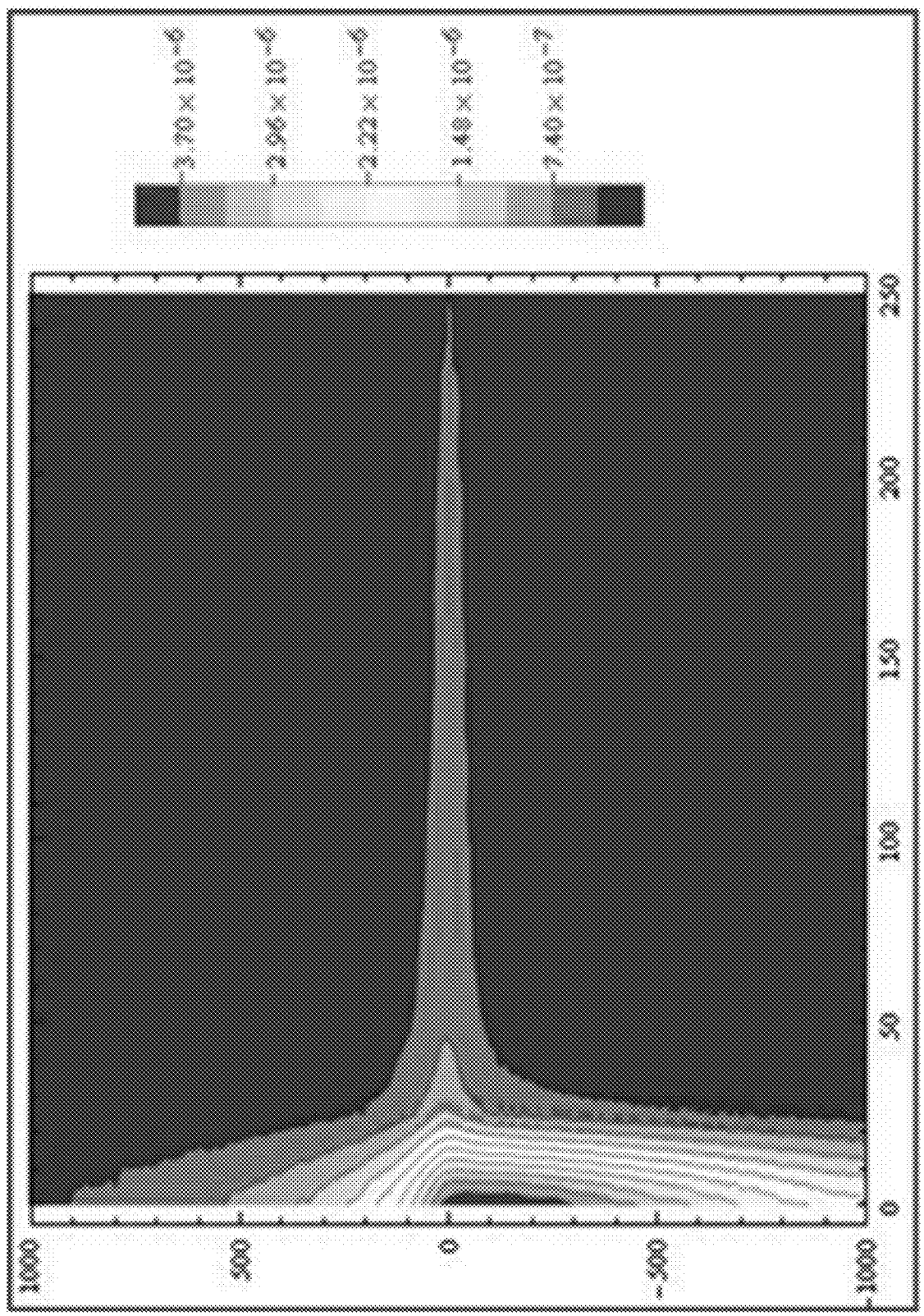
Figure 9:
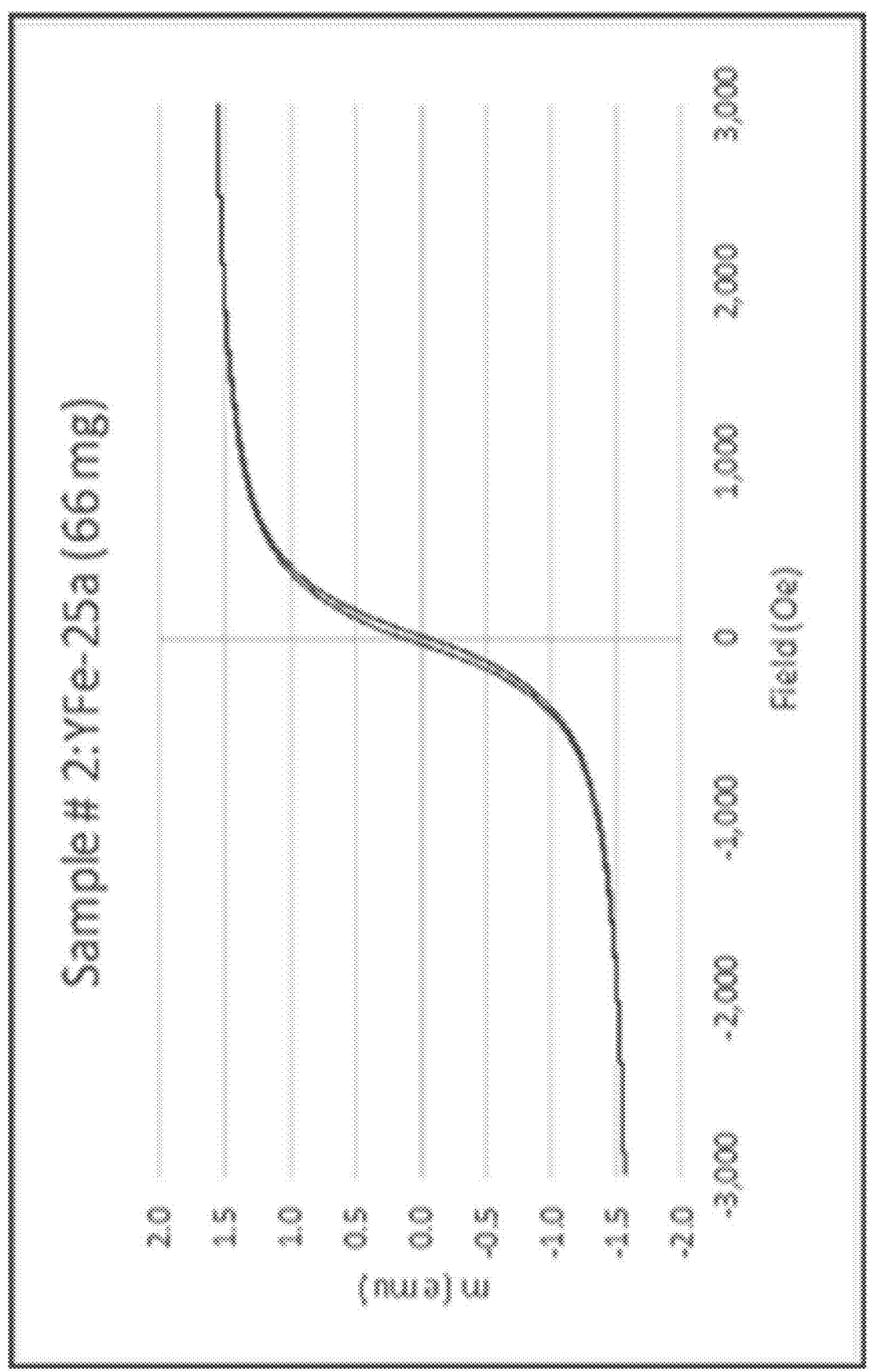
Figure 10:
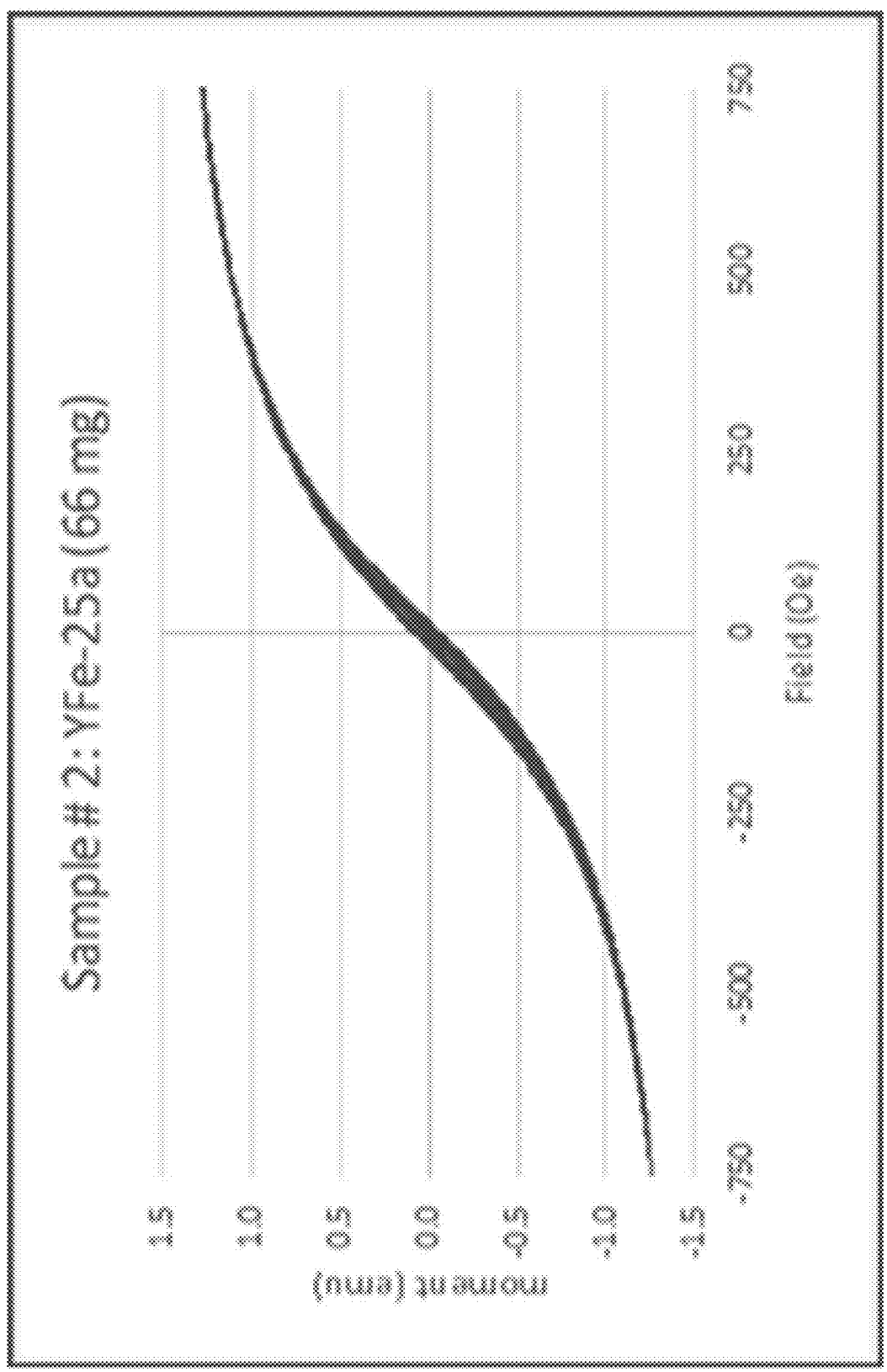

$NiFe_2O_4/Y_2O_3$ core-shell nanoparticles (e.g., SSA: 31.2 $m^2/g$) can be loaded in an Inconel reactor and regenerated at 1100° C. for 2 hours. Next, the reactor temperature was lowered to 900° C. and water-splitting step can be performed for hydrogen generation. The transient hydrogen volume profiles generated during five consecutive thermochemical cycles are shown in FIG. 6. The results indicated relatively stable hydrogen volume generation during eight thermochemical cycles using core-shell material as compared with a powdered mixture. The SEM analysis of core-shell nanoparticles shows lesser grain growth as compared to $NiFe_2O_4/Y_2O_3$ powdered mixture after performing multiple thermochemical cycles. Therefore, core-shell nanoparticle morphology appears to be effective in generating relatively similar hydrogen volumes over multiple thermochemical cycles.

As the materials can be prepared for use in hydrogen generation from a water-splitting reaction, in the following section one representative result obtained for core-shell ferrites is presented.

2.4.2 Exemplary Application: Electrical, Magnetic, and Electro-Magnetic

Magnetic measurements can also be performed on different ferrite materials. FIGS. 7-10 show First-Order-Reversal-Curve (FORC) measurements for a sol-gel derived Ni-ferrite material. Measurements can be performed by Lake Shore AGM and provide preliminary results. Hysteresis M(H) and first-order-reversal-curves (FORC) can be measured for each sample at ambient temperature using a Lake Shore MicroMag vibrating sample magnetometer (VSM). The FORC distribution function $\rho(H_a, H_b)$ can be calculated from the measured FORC data, and is the mixed second derivative, i.e., $\rho(H_a, H_b) = -\partial 2\, M(H_a, H_b)/\partial H_a \partial H_b$. The FORC diagram is a 2-D or 3-D contour plot of $\rho(H_a, H_b)$ with the axis rotated by changing coordinates from $(H_a, H_b)$ to $H_c=(H_b-H_a)/2$ and $H_u=(H_b+H_a)/2$, where $H_u$ represents the distribution of interaction fields, and $H_c$ represents the distribution of switching or coercive fields. The measured M(H) and FORCs can be presented in terms of magnetic moment (emu) versus applied magnetic field (Oe).

2.4.2.1 Results and Discussion

Exemplary methods of the present disclosure can generally be categorized into four tasks: i) synthesis of ferrite powdered material and formation of a core (e.g., a toroidal core), ii) characterization of the ferrite core, iii) conduct test procedures to analyze electrical properties and iv) electrically test cores using standard tests platforms. What follows is further description of the above-referenced tasks.

Synthesis and characterization of ferrite powdered materials, and formation of (e.g., toroidal) cores is further described as follows, wherein at least one exemplary aspect, MnZn and NiZn ferrites can be synthesized using commercially available metal salt precursors, which can be added in ethanol and sonicated until a visually clear solution is obtained. To this solution propylene oxide can be added to achieve a gel formation. As-synthesized gels can be aged, dried at 100° C. for 1 h and finally heated rapidly to different temperatures and quenched in air or $N_2$ environments.

Phase composition of ferrite materials can be analyzed by a commercially available Rigaku Ultima Plus X-ray diffractometer (e.g., CuK$\propto$ radiation, $\lambda$=1.5406 Å, 40 kV, 40 mA) and a commercially available graphite monochromator. The parameters such as 2θ, scanning speed and width of $10°\leq 2\theta \leq 80°$, 2° per minute and 0.020°, respectively can be used. Quantitative estimation of the phases present in the powders can be performed using the JADE software, v. 7.5 (Materials Data Inc.) following the 'Reference Intensity Ratio' (RIR) method.

The morphology of the calcined ferrite powders can be analyzed using a commercially available JEM-2100 transmission electron microscope. A Zeiss Supra 40 VP field-emission scanning electron microscope, Hitachi H-7000 FA can be used to understand microstructure of (e.g., toroidal) cores. For the SEM analysis, the electron high tension (EHT) can be used in the range of 1 to 2 kV. Both SE2 (secondary electron-2) and In-Lens detectors can be used for the analysis. For TEM analysis, ferrite nanoparticles can be sonicated in ethanol and this dispersion can be added onto the carbon coated copper grids, which can be further plasma cleaned to remove the impurities.

Figure 11:
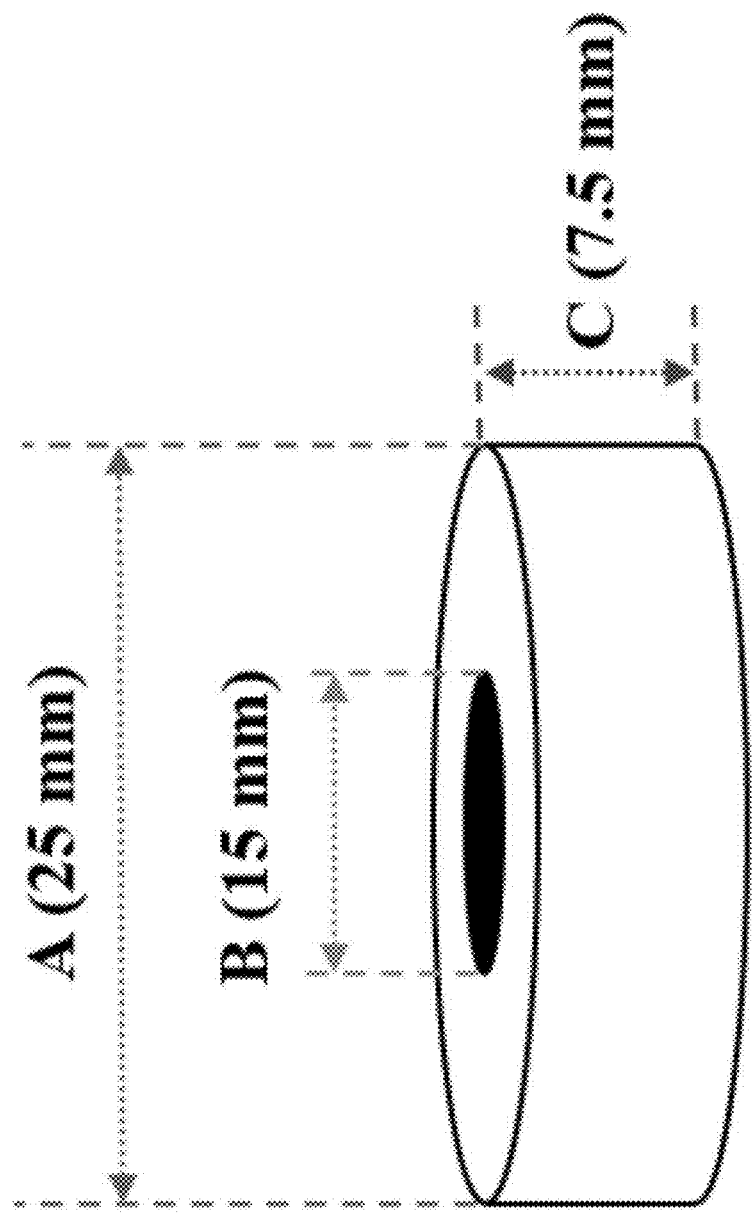
FIG. 11 is a pictorial representation of a molded core from dry pressing ferrite powder in accordance with an illustrative aspect of the present disclosure.

Core shape (e.g., toroidal core shapes) formation can be achieved by using at least one of the following exemplary methods. Dry pressing can be used in accordance with at least one exemplary method. As such, the resultant ferrite powdered material can be taken into the mold and pressed under high pressure force using a Carver's press to form the core with desired geometry as shown in the FIG. 11. A stainless steel mold can be designed and machined as per the required dimensions.

Figure 12:
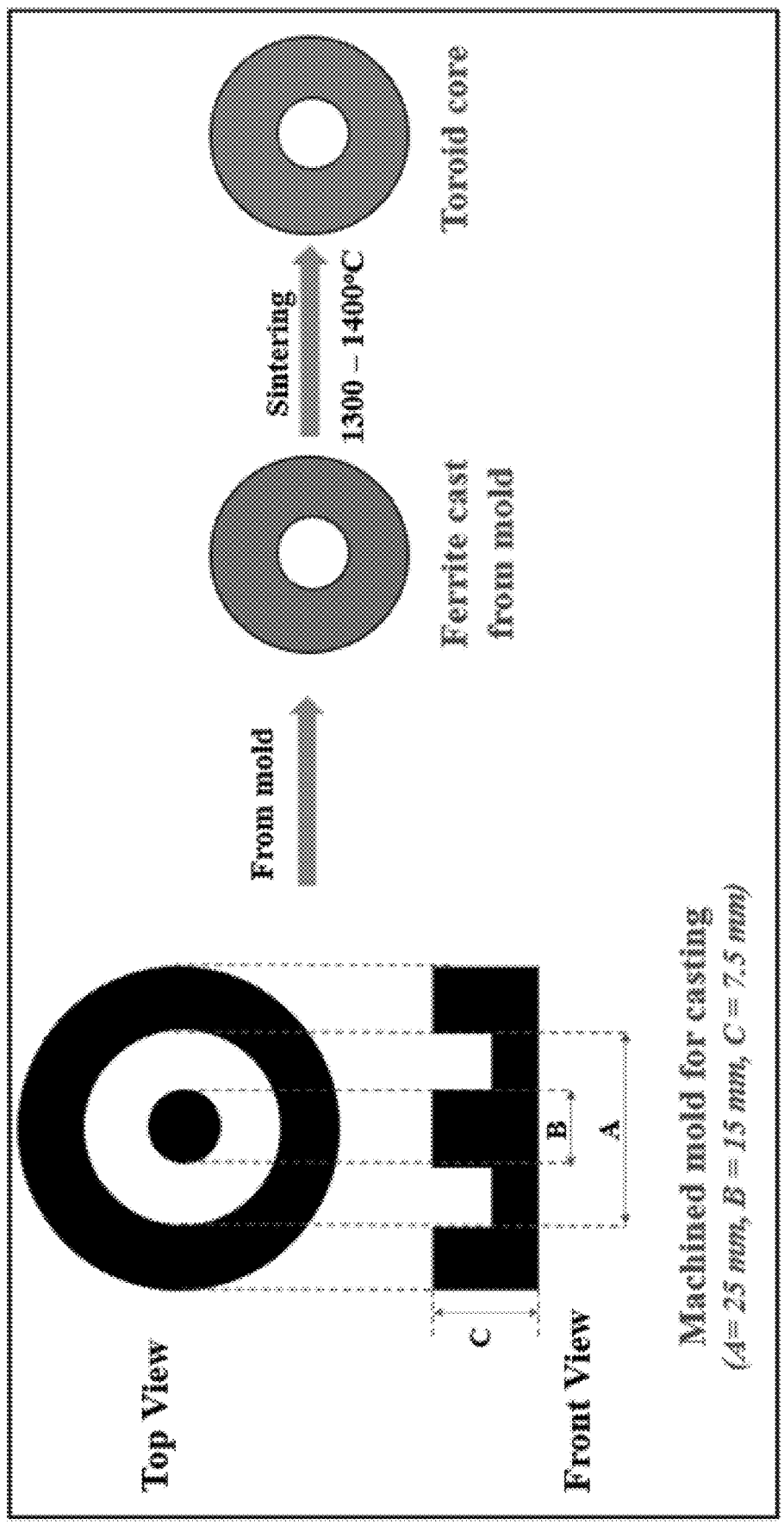
FIG. 12 is a pictorial representation of molding and casting of ferrite powders to form the desired (e.g., toroid) core in accordance with an illustrative aspect of the present disclosure.

Molding and casting can be achieved by using at least one of the following exemplary methods. In at least one exemplary step, as-prepared ferrite powdered materials can be added to a polymeric binder, (e.g., commercially available B73305 Ferro Corp., San Marcos, CA), which contains 60 wt % poly(vinyl butyral) (PVB) and 40 wt % dioctyl phthalate (DOP) in a solvent mixture or epoxy resin that can be cured at room temperature. In at least one other exemplary step, a slurry can be obtained in the prior step can be mixed thoroughly for few minutes and casted. Cast specimen can be dried and sintered at 1300-1500° C. in a commercially available Thermolyne 46100 furnace. FIG. 12 shows an exemplary schematic of the entire process of making toroidal core.

Characterization of ferrite core can be achieved by using at least one of the following exemplary methods. Core specimens can be characterized by x-ray diffraction (XRD), x-ray fluorescence (XRF), and scanning electron microscopy (SEM)/energy dispersive spectroscopy (EDX), which are commercially available. XRD can provide details about the phase purity and composition whereas SEM can provide the microstructure of the specimen with any defects (pores, triple junction, and boundary migration) in the microstructure. EDX analysis can provide elemental composition of the specimen.

Standardizing test procedures to measure electrical properties of ferrites can be achieved using at least one of the following methods. Standard test procedures can measure several electrical properties of ferrite materials, which include a) initial permeability, b) flux density, c) remanence, d) coercivity, e) core loss, f) curie temperature, g) electrical resistivity and h) density. Standard test can be further used on a routine basis to test ferrite specimens. Commercially available exemplary instrumentation can include, but is not limited to, an Agilent Technologies Network Analyzer (E5061B), a Wayne Kerr Precision Magnetics Analyzer (PMA3260A), an Agilent 34970A Data Acquisition/Switch Unit, and a Thermotron S-16 Temperature Test Chamber.

Electrical tests of the toroidal cores can be achieved using at least one or more of the standard tests enumerated herein. Ferrite (e.g., toroidal) cores can be designed, prepared and thoroughly analyzed by standard tests developed herein.

3. Applications in Thermochemical Water-Splitting

Among the several process investigated, thermochemical water-splitting process that produces cleaner $H_2$ without generating any $CO_2$ emissions are of principle interest unlike traditional methane steam reforming. During the thermochemical water-splitting process, both the oxidation and reduction reactions takes place simultaneously generating $O_2$ and $H_2$ in individual steps. Due to the inverse spinel structure, ferrite materials are best known redox materials for $H_2$ generation using this hybrid process. During this two-step process, the redox materials are partially reduced by releasing $O_2$ during the regeneration step at elevated temperatures of 1100° C.-1150° C. and later, releasing $H_2$ during the water-splitting step when steam is passed through the partially reduced redox material by compensating the oxygen vacancies created during the regeneration step. Together, a regeneration step and water-splitting step comprise one thermochemical cycle. $NiFe_2O_4$ nanoparticles proved to be the best material for efficient $H_2$ generation using a thermochemical water-splitting process. However at high temperature multiple thermochemical cycling, $H_2$ volume produced during the water-splitting step gradually decreases due to grain growth and sintering phenomenon. To address this issue, synthesis of novel core-shell ferrite nanoparticles using sol-gel technique was attempted, where these nanoparticles such as $NiFe_2O_4$ are encapsulated in the shell of thermally stable ceramic nanoparticles like $ZrO_2$ and $Y_2O_3$. Due to the high temperature applications of ceramic particles such as yttria, synthesis of novel refractory ceramic based ferrite nanoparticles such as yttrium ferrite using sol-gel technique is performed. Due to its strong ferromagnetic nature, U.S. Pat. No. 3,386,799 to Grodkiewicz et al. developed single crystal yttrium ferrite/yttrium iron garnet (YIG) at 1300° C. in a flux comprising lead fluoride and boron oxide, or mixtures thereof with lead oxide by adding calcium oxide. The single crystal YIG has been used in microwave devices. As YIG spheres are widely used as narrow band filters and microwave resonators, U.S. Pat. No. 4,060,448 to Nemiroff et al., discloses a procedure of growing YIG films by liquid phase epitaxy (LPE) technique at about 950° to 960° C. and later fabricating YIG disks on gadolinium gallium substrates for microwave applications. Due to its crystalline nature, YIG ($Y_3Fe_5O_{12}$) is widely used in variety of electronic devices. Due to the high quality of films produced by LPE techniques, a major interest has been drawn towards development of YIG films for applications in magnetic bubble domain devices and in microwave signal processing devices. U.S. Pat. No. 4,273,610 to Glass et al. developed a method for controlling the resonance frequency of single crystal YIG films which were grown by LPE. U.S. Pat. No. 4,256,531 to Kimura et al. discloses a process for producing high quality single YIG crystal of diameter 1 mm by mixing the components of $Y_2O_3$ and $Fe_2O_3$ with optional addition of rare earth oxides and $Al_2O_3$ or $Ga_2O_3$ as additional components and calcining them at 1000° C. Other disclosures such as U.S. Pat. No. 3,299,376 to Sedlak et al. and U.S. Pat. No. 4,420,731 to Schiebold et al. disclose the unique properties of YIG in the field of electromagnetics as resonators, oscillators, and other tunable devices. Further advancing past developments in the YIG art, what is disclosed is a unique sol-gel method which has a potential to commercially produce high quality YIG nanoparticles at lower cost. In one or more novel methods, systems and processes, what is claimed is the application of YIG nanoparticles in the field of renewable energy as an important source for $H_2$ generation via thermochemical water-splitting reaction.

$H_2$ as a cleaner fuel can be efficiently generated from a thermochemical water-splitting process. This can be a two-step process where in one or more of the steps (regeneration), the redox material(s) are heated at higher temperatures of 900° C.-1600° C. that create oxygen vacancies. In another one of the steps (water-splitting), $H_2$ can be produced by scavenging the oxygen from the steam at lower temperatures of 700° C.-1400° C. Together these two steps can be referred to as one thermochemical cycle. It has been observed that during multiple thermochemical cycles at such high temperatures, thermal stresses are induced in the redox materials leading to particle sintering and grain growth. Consequently, the $H_2$ volume generated during a thermochemical water-splitting process decreases with an increase in thermochemical cycles. Relatively stable $H_2$ volume can be generated during multiple thermochemical cycling operation(s) by making use of thermally stabilized redox materials.

For example, by encapsulating the redox nanoparticles within a ceramic shell, a core-shell morphology can be created, which can inhibit the grain growth or particle sintering of ferrite nanoparticles especially at high temperatures. Thus, the thin-shell of a ceramic material can act as a physical barrier preventing grain growth of ferrite nanoparticles. Thus, an object, feature or advantage of the present disclosure is contained in a method, system and process for making use of core-shell redox materials relatively stable $H_2$ volume generated during a multiple thermochemical cycling operation. In the present disclosure, methods, systems and processes provide synthesis of core-shell nanoparticles such as Ni-ferrite/$Y_2O_3$, and Ni-ferrite/$ZrO_2$ via a surfactant templating assisted sol-gel method. More broadly, the methods, systems and processes of the present disclosure disclose $H_2$ generation via thermochemical water-splitting reaction using core-shell nanoparticles. As yttria does not undergo any phase transformations at high temperatures, yttrium iron garnet (YIG) is synthesized and its $H_2$ generation ability is disclosed. Thus, the present disclosure reports, in at least one exemplary implementation, the hydrogen generation ability of yttrium ferrite synthesized using a sol-gel technique.

In addition, the present disclosure discloses thermal stabilization by immobilization of redox nanoparticles into a porous ceramic support of yttria stabilized zirconia (YSZ, 10 mol % $Y_2O_3$) using a sol-gel technique. In a preferred aspect, immobilization can prevent grain growth and sintering of redox nanoparticles. Thus, an object, feature or advantage of the present disclosure is contained in a method, system and process for making immobilized redox nanoparticles onto a porous ceramic support producing relatively stable $H_2$ volume during a multiple thermochemical cycling operation.

3.1 Materials & Methods

Figure 13:
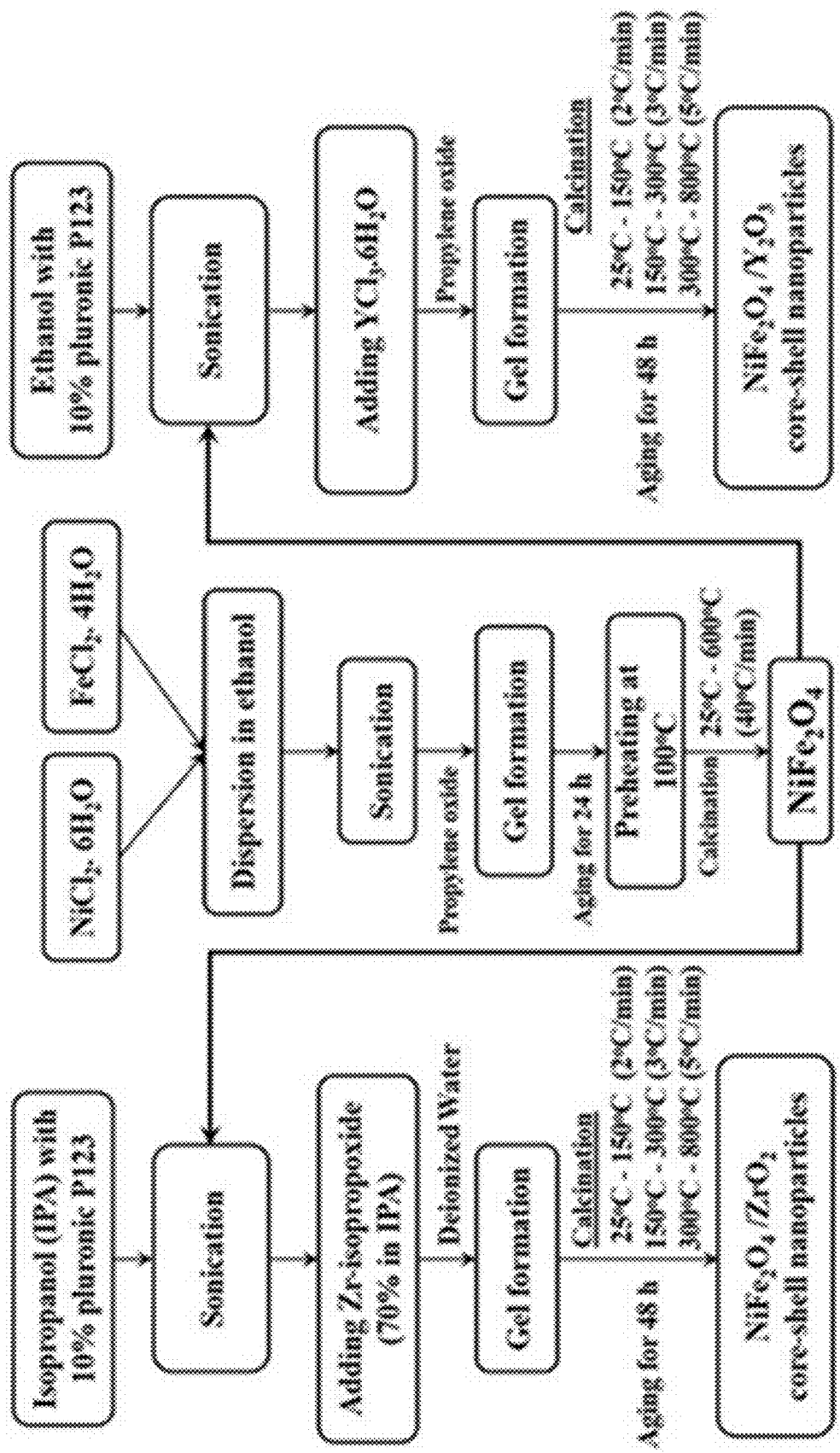
FIG. 13 are further exemplary synthesis processes of core-shell nanoparticles in accordance with an illustrative aspect of the present disclosure.

3.1.1 Synthesis of Ni-Ferrite and Core-Shell Nanoparticles by Sol-Gel Method Ni-ferrite can be synthesized by the sol-gel method using $NiCl_2$ and $FeCl_2$ precursors. These precursors can be sonicated in ethanol for about 90 minutes to obtain a visually clear solution. To this solution, propylene oxide can be added to achieve a gel formation. The gel can be aged, dried and calcined at different temperatures (600° C.-1000° C.) to obtain a ferrite material. The sol-gel derived Ni-ferrite can be sonicated in ethanol for 2 hours to achieve the preferred dispersion. To this dispersion, Pluronic P123/CTAB surfactant and the precursors of $Y_2O_3$ or $ZrO_2$ can be added and the dispersion can be sonicated for few hours. For $Y_2O_3$ and $ZrO_2$, yttrium chloride and Zr-isopropoxide precursors can be utilized respectively. Finally, propylene oxide or water can be added leading to the gel formation. The resultant gels are aged for 48 hours and can be preheated at 120° C. for 2 hours and calcined in air up to 800° C. The calcining may be done using ramp up temperatures, such as at 25° C.-150° C. at 2° C./min, 150° C.-300° C. at 3° C./min, and/or at 300° C.-800° C. at 5° C./min. An exemplary synthesis process in accordance with an illustrative aspect of the present disclosure is pictorially represented in FIG. 13.

Figure 14:
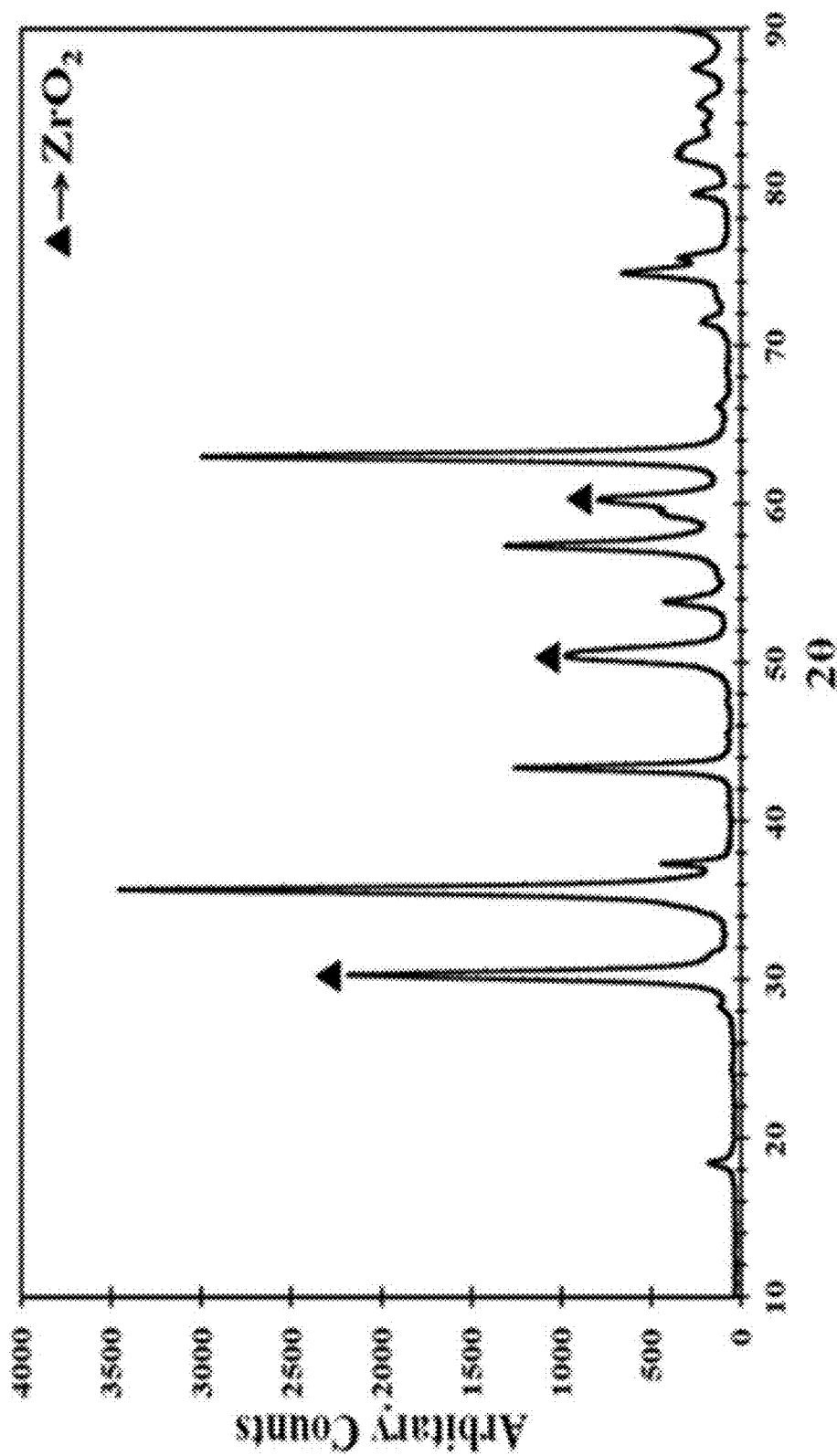
FIG. 14 is a pictorial representation of XRD pattern of core-shell $NiFe_2O_4/ZrO_2$ nanoparticles in accordance with an illustrative aspect of the present disclosure.
Figure 15:
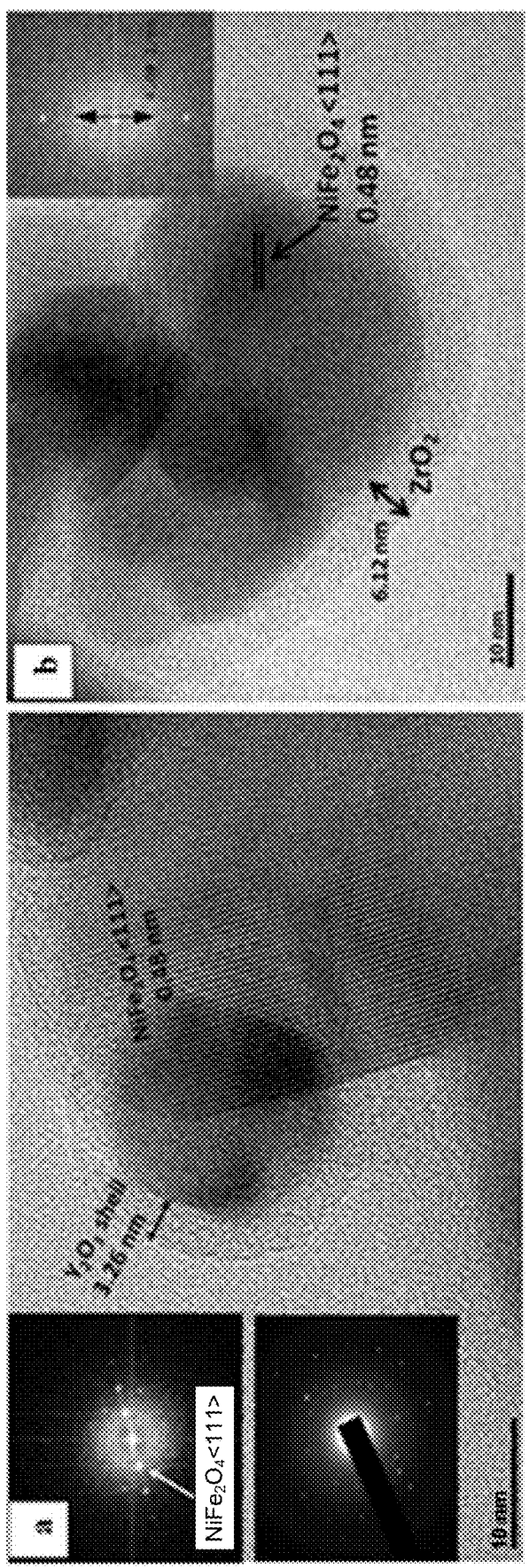
FIG. 15 is a pictorial representation of HRTEM images of a) $NiFe_2O_4/Y_2O_3$, b) $NiFe_2O_4/ZrO_2$ nanoparticles showing the core-shell morphology in accordance with an illustrative aspect of the present disclosure.

After calcining the nanoparticles at 800° C., XRD analysis can be done to determine the phase composition. Sol gel derived Ni-ferrite and core-shell ferrite nanoparticles can be characterized by XRD and the profiles obtained are shown in FIGS. 14 and 15. The 2θ reflections corresponding to 32.32°, 35.70°, 37.32°, 43.38°, 53.92°, 57.36° and 63° indicate nominally phase pure composition of $NiFe_2O_4$, which is consistent with the ICDD (International Center for Diffraction Data) pattern. The XRD profile of these $NiFe_2O_4/Y_2O_3$ core-shell nanoparticles is included in FIG. 3. The XRD pattern (not shown) of commercially available $Y_2O_3$ nanoparticles revealed the 2θ reflections of 29.24°, 33.86°, 35.98°, 38.02°, 39.92°, 41.76° 43.58°, 53.32° and 57.68°. The major peak positions of 35.98° and 43.58° corresponding to $Y_2O_3$ reflections in core-shell nanoparticles are found to be masked with 2θ major reflections of $NiFe_2O_4$. As the core-shell nanoparticles can be prepared by calcination at 800° C., in at least one exemplary aspect of the present disclosure the $Y_2O_3$ mostly remains in the amorphous form. When core-shell nanoparticles are subjected for thermochemical water-splitting at 900C°-1000° C. and analyzed; their XRD pattern (FIG. 3) revealed additional 2θ reflection of characteristic $Y_2O_3$ at 33.86°. The intensity of major 2θ reflections corresponding to $Y_2O_3$ is found to be higher indicating crystallization of $Y_2O_3$ in core-shell nanoparticles after a high temperature thermochemical water-splitting reaction.

The XRD pattern of the $NiFe_2O_4$/(25 wt %)$ZrO_2$ core shell nanoparticles is shown in FIG. 14. Three characteristic peaks can be observed for zirconia at 2θ=30.22°, 50.39° and 60.06°, corresponding to the miller indices (111), (220), and (311). These 2θ reflections are found to be consistent with those reported in the art. The intensity of the peaks is found to increase with zirconia loadings. The resultant zirconia shell is found to be of tetragonal phase, which is consistent with the JCPDS, No 17-0923.

Core-shell morphology is clearly observed for the $NiFe_2O_4/Y_2O_3$ and $NiFe_2O_4/ZrO_2$ nanoparticles. As shown in FIGS. 5 and 15, $NiFe_2O_4$ is coated with a uniform amorphous shell of $Y_2O_3$ or $ZrO_2$ with a shell thickness of 3.26 nm and 6.12 nm, respectively. The lattice spacing of 0.48 nm directly confirms the projected symmetry of $NiFe_2O_4$ oriented along the [111] plane. It is also observed that the refractory shell of $Y_2O_3$ and $ZrO_2$ are formed over the agglomerates of $NiFe_2O_4$ nanoparticles.

Figure 16:
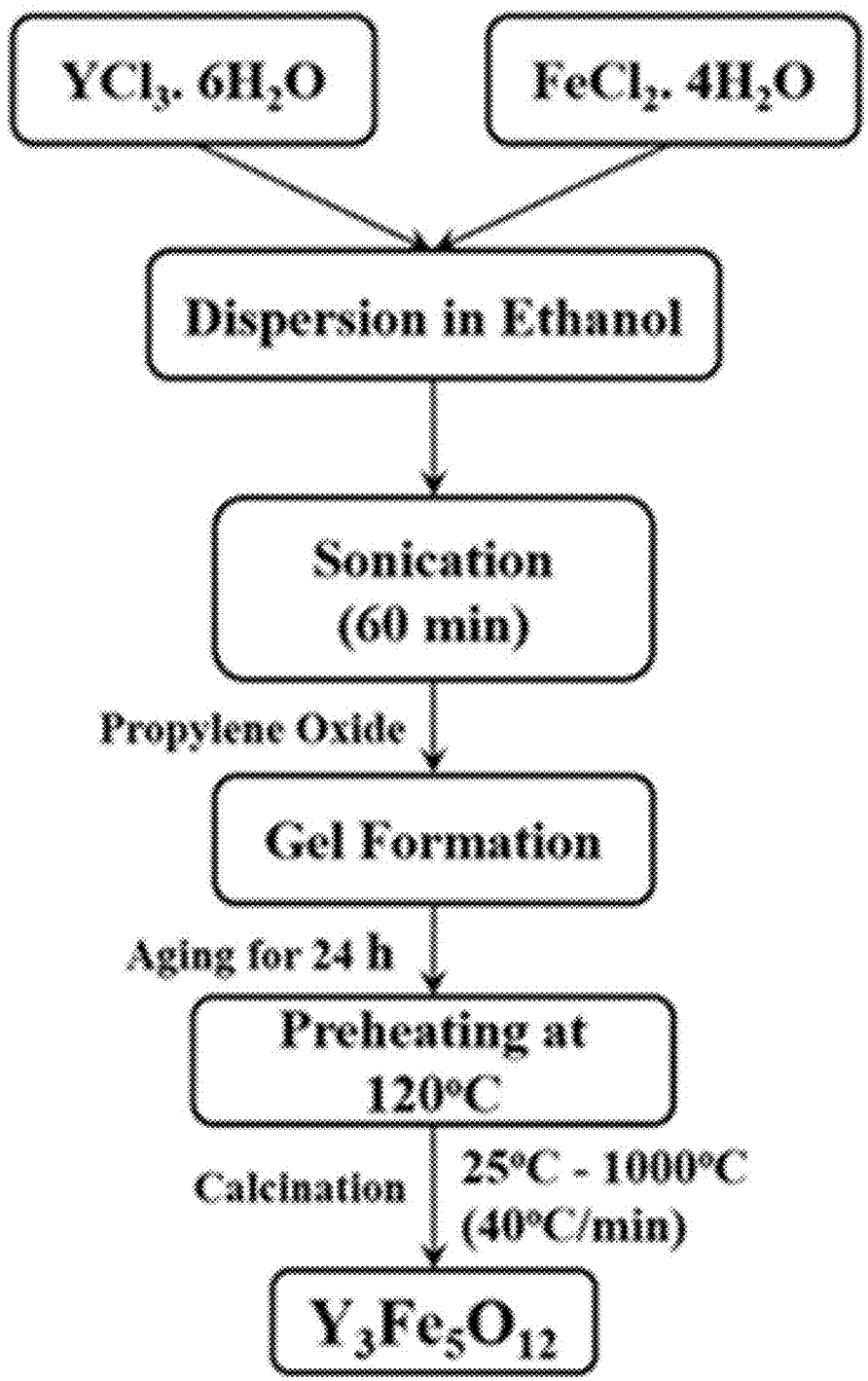
FIG. 16 is an exemplary synthesis route for Y-ferrite in accordance with an illustrative aspect of the present disclosure.

3.1.2. Synthesis of Refractory Garnet Ferrite by Surfactant Templating Assisted Sol-Gel Method A refractory ceramics-based precursor can be used to prepare Y-ferrite. During sol-gel synthesis, $YCl_3$ and $FeCl_2$ precursors can be added in stoichiometric ratio in the presence of non-ionic and ionic surfactants such as Pluronic123 and cetyl trimethyl ammonium bromide (CTAB), respectively. These precursors can be sonicated in ethanol for about 60 minutes to obtain a visually clear solution. To this solution, propylene oxide can be added to achieve the gel formation. The gel will be aged, dried and calcined at 1000° C. to obtain Y-ferrite. The synthesis process in shown illustratively in FIG. 16.

Figure 17:
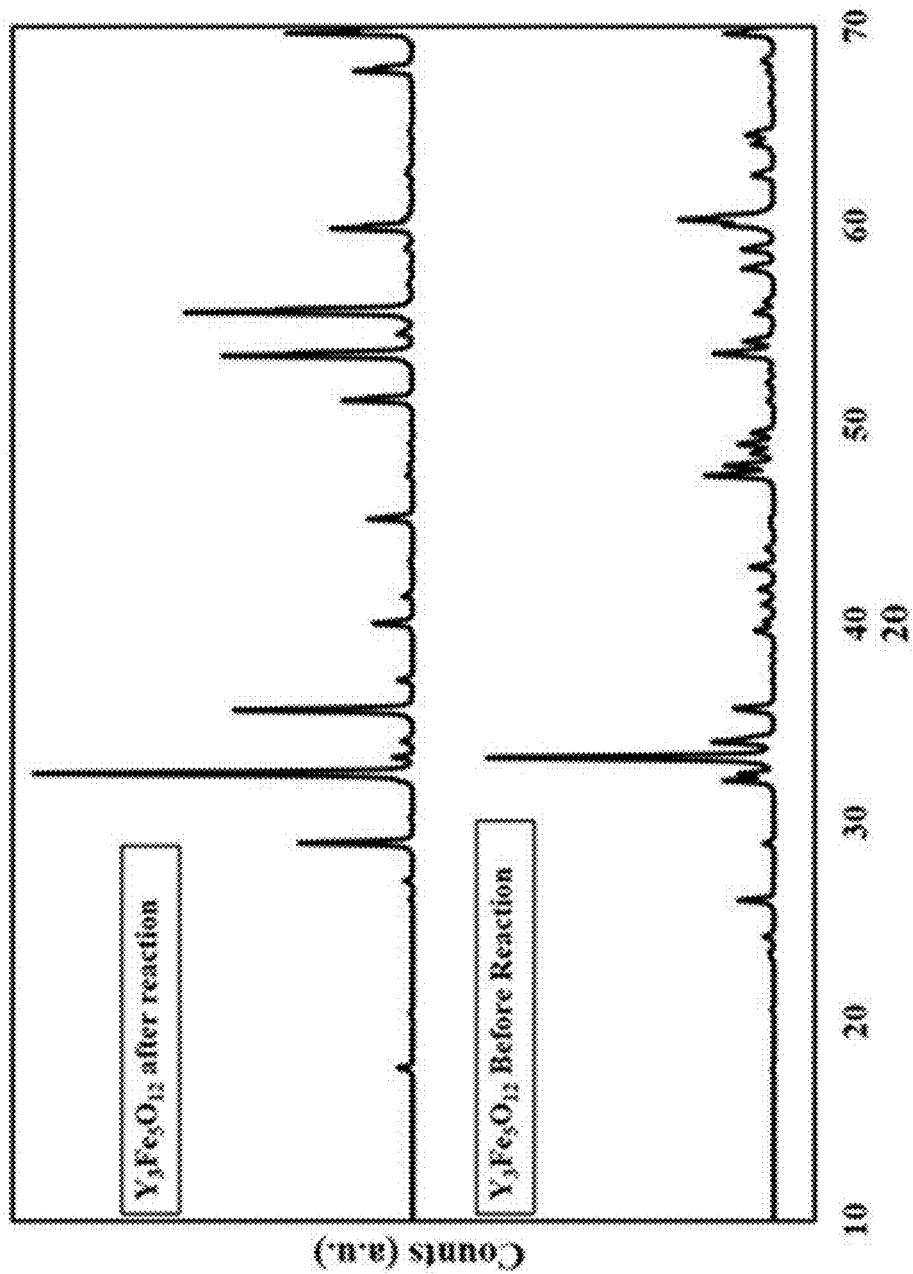
FIG. 17 is a pictorial representation of X-ray diffraction patterns of yttrium ferrite nanoparticles before and after thermochemical water-splitting reaction where regeneration is performed at 1150° C. and water-splitting was performed at 1050° C. in accordance with an illustrative aspect of the present disclosure.

As calcined powdered mixtures are analyzed for their phase composition using XRD analyzer range of 10°≤2θ≤70°. The XRD results revealed a garnet structure with the phase composition of $Y_3Fe_5O_{12}$ as shown illustratively in FIG. 17. The X-ray diffraction profile of the material obtained after multiple thermochemical water-splitting cycles is found to have same phase composition of $Y_3Fe_5O_{12}$.

3.1.3. Synthesis of Immobilized Ferrite Nanoparticles onto Porous YSZ

Figure 18:
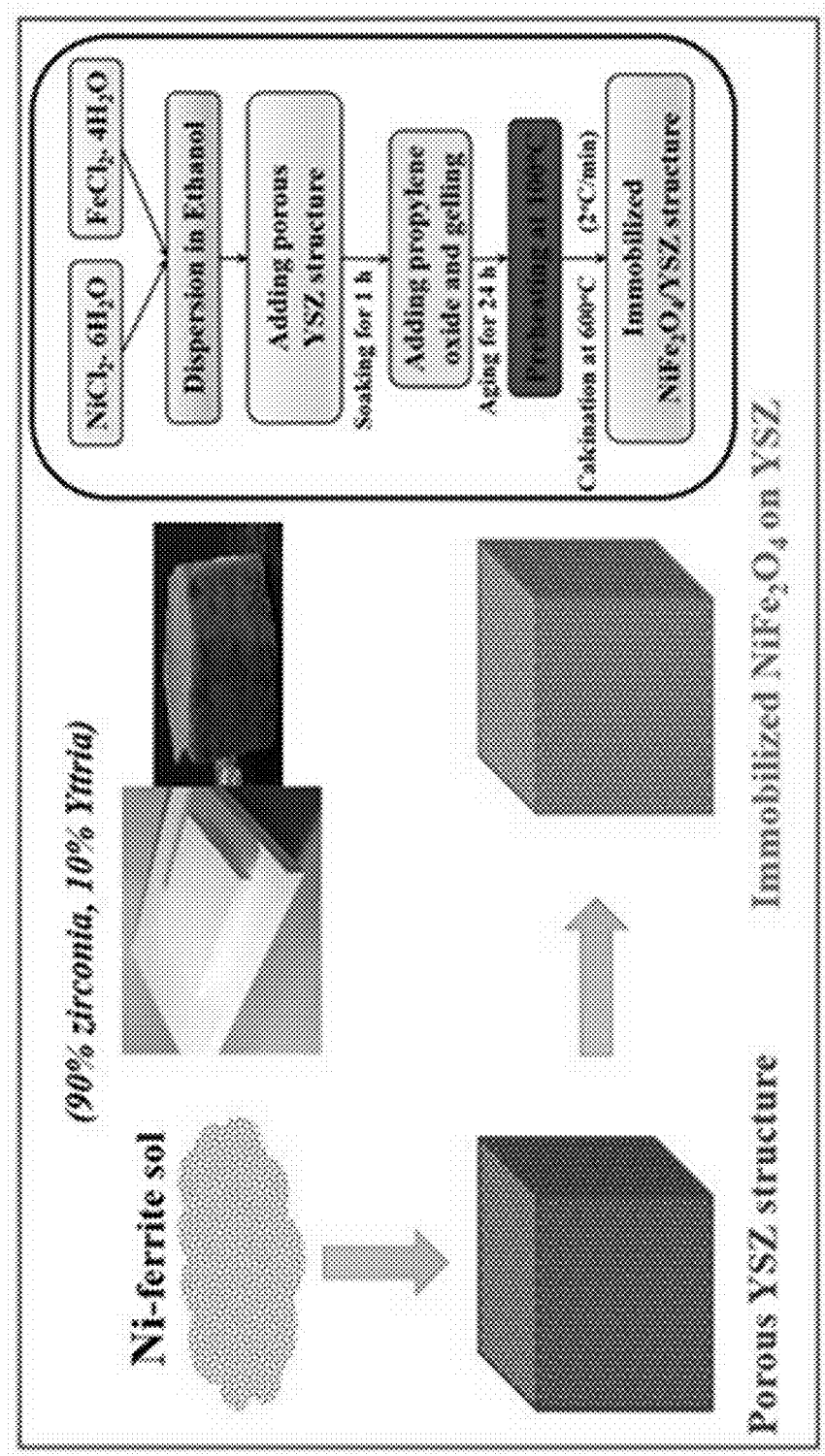
FIG. 18 is a pictorial representation of synthesis method and schematic representation of $NiFe_2O_4$ immobilized porous YSZ structure in accordance with an illustrative aspect of the present disclosure.

Precursor salts of nickel ($NiCl_2 \cdot 6H_2O$) and iron ($FeCl_2 \cdot H_2O$) are provided in stoichiometric quantities in a glass beaker containing absolute ethanol and sonicated to achieve a visually clear solution. As-received YSZ (ZYBF-6, purchased from Zircar Zirconia, Inc.), can be cut into small hexagonal shaped structures and soaked in the solution of precursor salts for approximately 1 hour. Next, propylene oxide can be added to achieve a gel formation inside the porous structure. The resultant gel formed within the soaked porous YSZ structure can be aged for approximately 24 hours, preheated in a conventional oven at 100° C. for 1 hour and calcined at 600° C. at the rate of 2° C./min. A synthesis procedure for obtaining immobilized ferrite nanoparticles in a porous ceramic support is detailed in FIG. 18.

Figure 19:
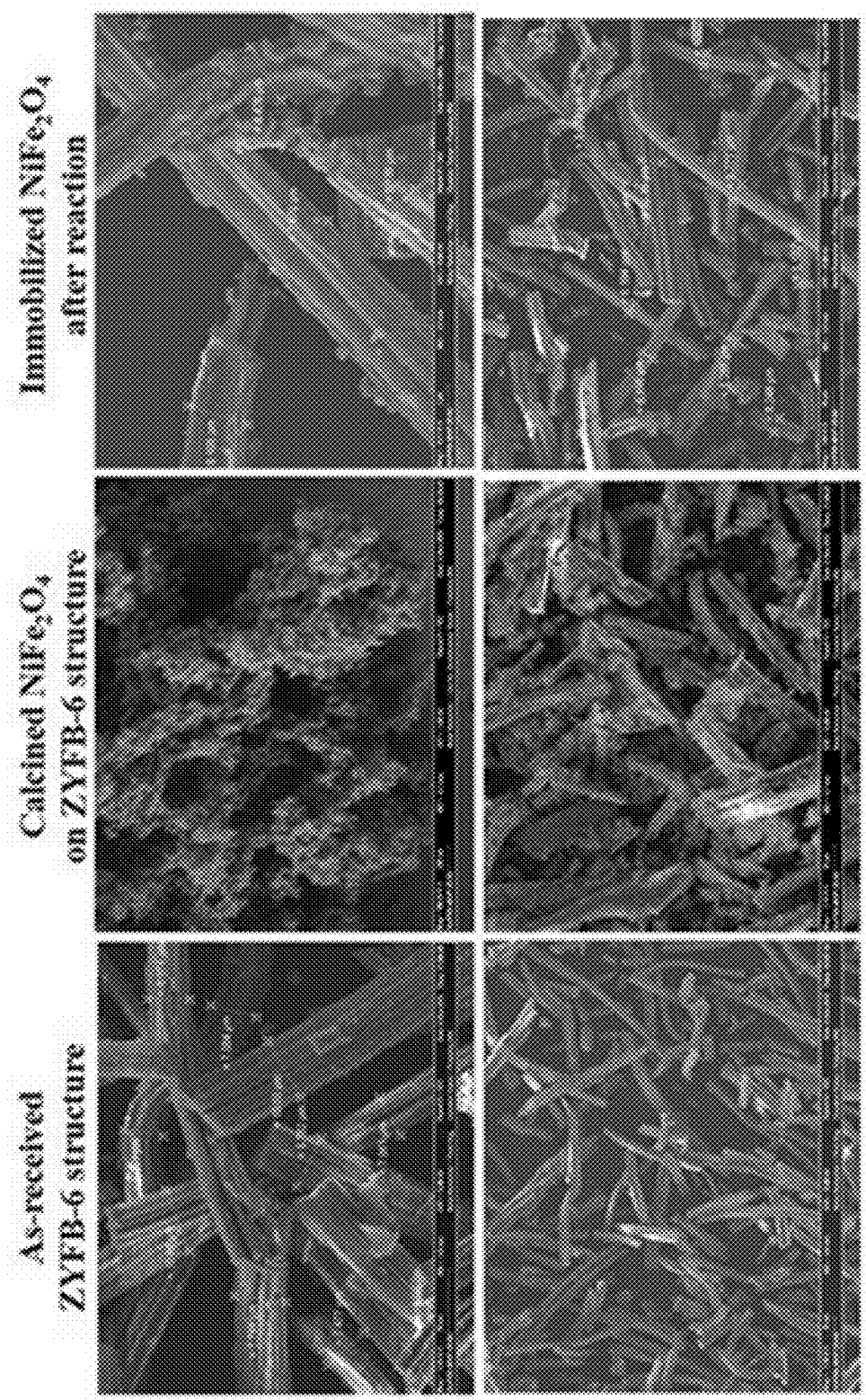
FIG. 19 is a pictorial representation of SEM images of as-received YSZ (ZYFB-6) and $NiFe_2O_2$ immobilized YSZ before (calcined) and after water-splitting reaction in accordance with an illustrative aspect of the present disclosure.

The morphology of as-received ZYFB-6 and $NiFe_2O_4$ immobilized ZYFB-6 can also be studied using SEM (FIG. 19). SEM study reveals that as-received ZYFB-6 is made-up of randomly oriented porous fibers whereas the immobilized structure indicated the presence of nanoparticles inside the porous ceramic support.

3.2 Results and Discussion

Figure 20:
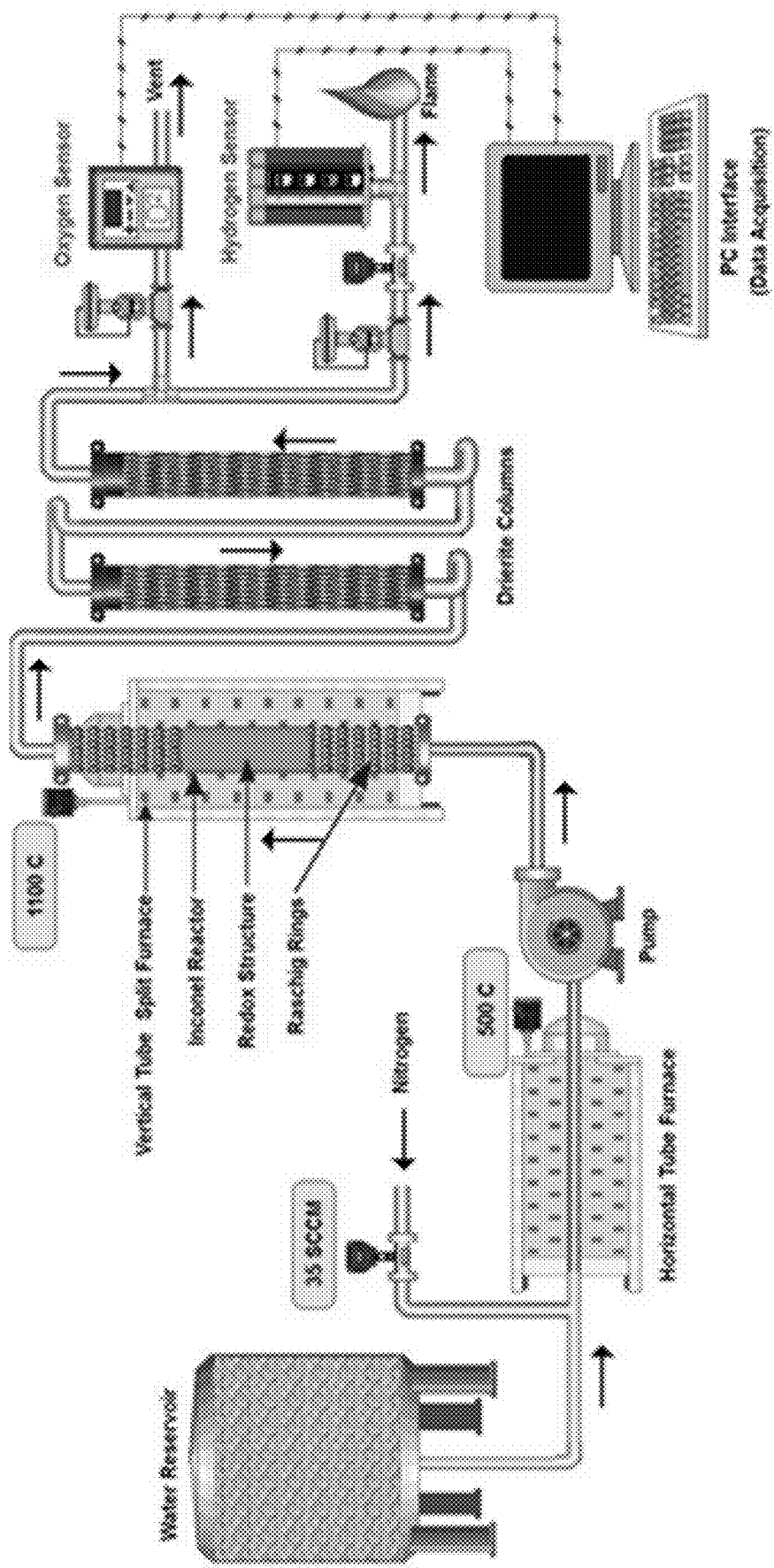
FIG. 20 is a pictorial representation of a thermochemical water-splitting reactor set-up for $H_2$ generation in accordance with an illustrative aspect of the present disclosure.

What follows is exemplary results and discussion from testing nanoparticles in a thermochemical water-splitting reactor. The experimental setup as shown illustratively in FIG. 20, consisted of a vertically split high temperature furnace (~1200° C., Carbolite Inc., USA) to hold an Inconel tubular reactor (O.D.=1 inch, I.D.=0.8 inch, length=26 inch) loaded with the redox material and a horizontal tube furnace (Carbolite Inc., USA) to vaporize the deionized water, which was continuously pumped using a metering pump (Fluid Metering Inc., USA). Redox material(s) can be packed with raschig rings (Brewhaus America Inc., USA) inside an Inconel reactor. $N_2$ (ultra-high purity ~99.99%) can be used as a carrier gas. The $N_2$ flow rate can be controlled by the mass flow meter (AALBORG Inc., USA) mounted on the feed line. The $O_2$ evolved during the regeneration step can be continuously measured using a calibrated GPR2900 (Advanced Instruments Inc., CA) oxygen sensor. The sensor can utilize advanced galvanic sensor technology for detecting the partial pressure of $O_2$ from very low 'ppm' values to 100% level in the gas stream. The $O_2$ generated by the redox material during the regeneration step reacts at the sensing electrode and produces an electrical current proportional to its concentration in the gas stream. A sensor calibration of electric current output as a function of $O_2$ concentration can be performed to infer $O_2$ concentration profiles during the regeneration step. The concentration of the $H_2$ gas generated during the water-splitting step can be continuously monitored by a hydrogen gas sensor (H2SCAN Corp., USA), which can be interfaced with the computer or programmable logic controller. As it is preferred that the $H_2$ sensor operate under dry condition, two moisture adsorption columns loaded with drierite (anhydrous calcium sulfate) (W.A. Hammond Drierite Inc., USA) can be installed between the reactor outlet and sensor inlet. All the process lines can be connected by seamless stainless steel (SS316) tubing, which can also include athermal insulator such as glass wool (McMaster-Carr, USA). As a safety precaution, the $H_2$ gas generated at the reactor outlet can be continuously burned.

Figure 21:
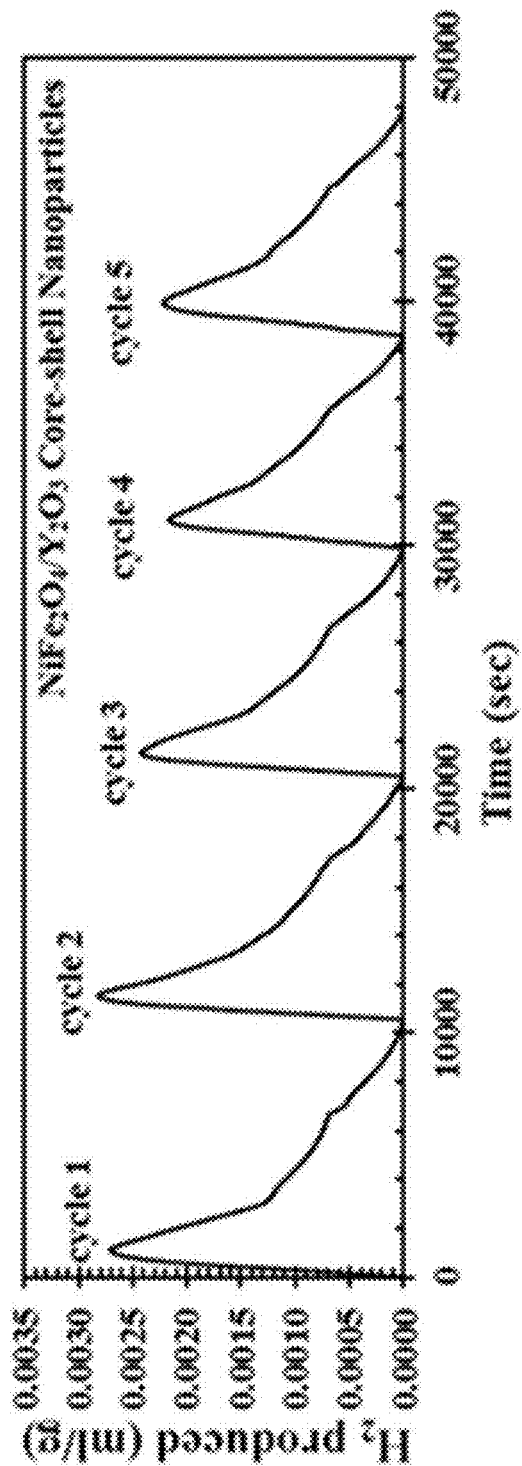
FIG. 21 is a pictorial representation of transient $H_2$ profiles obtained during five thermochemical cycles for $NiFe_2O_4/Y_2O_3$ core-shell nanoparticles in accordance with an illustrative aspect of the present disclosure.

3.2.1. $H_2$ Generation Via $NiFe_2O_4/Y_2O_3$ Core-Shell Nanoparticles $NiFe_2O_4/Y_2O_3$ core-shell nanoparticles were loaded in the Inconel reactor and regenerated at 1100° C. for 2 hours. Next, the reactor temperature was lowered to 900° C. and water-splitting step was performed for $H_2$ generation. The transient $H_2$ volume profiles generated during five consecutive thermochemical cycles at $N_2$ flow rate of 35 SCCM are shown in FIG. 21.

Figure 22:
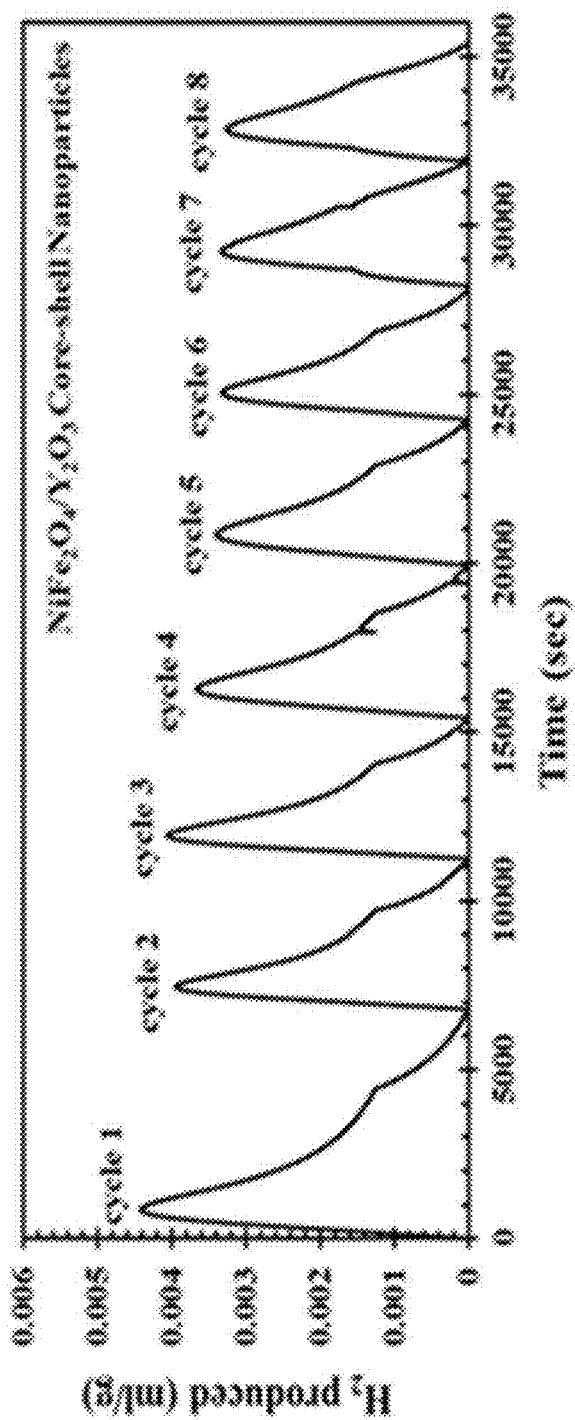
FIG. 22 is a pictorial representation of transient $H_2$ profiles obtained during eight thermochemical cycles for $NiFe_2O_4/Y_2O_3$ core-shell nanoparticles in accordance with an illustrative aspect of the present disclosure.

We have also investigated eight thermochemical cycles at $N_2$ flow rate of 75 SCCM and the transient $H_2$ profiles. For example, FIG. 22 shows transient $H_2$ profiles obtained during eight thermochemical cycles for $NiFe_2O_4/Y_2O_3$ core-shell nanoparticles where water splitting and regeneration steps were performed at 900° C. and 1100° C., respectively with the carrier gas flow rate of 75 SCCM.

Figure 23:
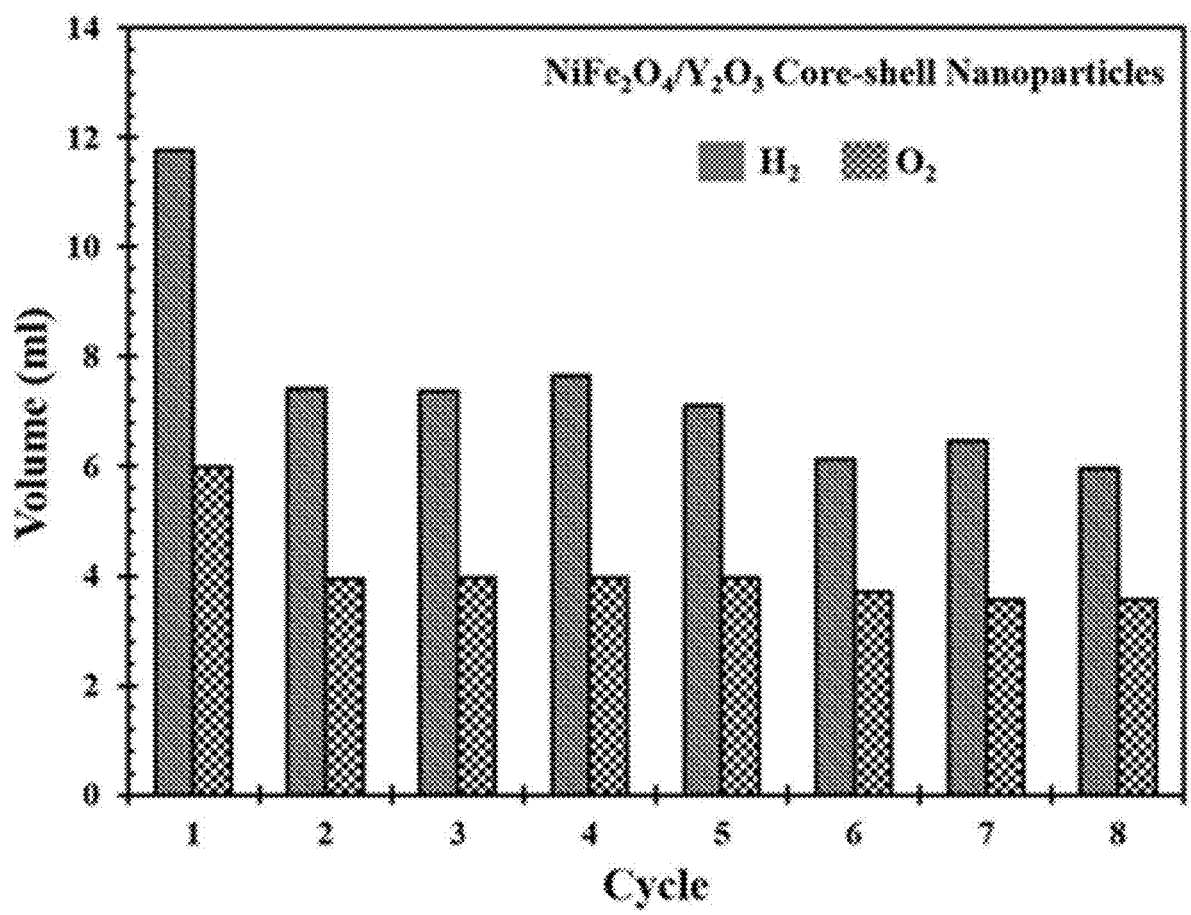
FIG. 23 is a pictorial representation of $H_2$ and $O_2$ volume produced during eight thermochemical cycles in accordance with an illustrative aspect of the present disclosure.

A similar trend in $H_2$ volume generation was observed at different flow rates. The $H_2$ and $O_2$ volume for eight thermochemical cycles for core-shell nanoparticles and powdered mixtures respectively, was found to be in stoichiometry. For example, FIG. 23 shows $H_2$ and $O_2$ volume produced during eight thermochemical cycles where regeneration and water-splitting steps were performed at 1100° C. and 900° C. respectively under $N_2$ flow rate of 75 SCCM.

Figure 24:
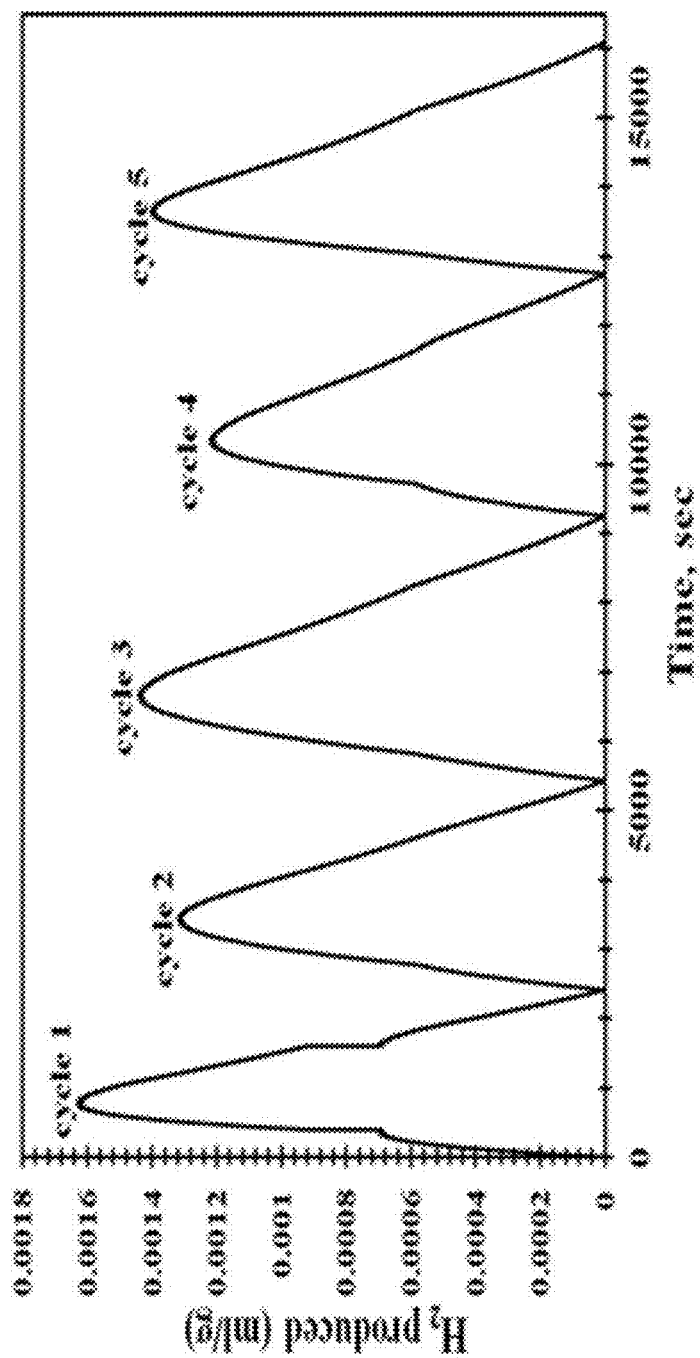
FIG. 24 is a pictorial representation of transient $H_2$ profiles obtained during five thermochemical cycles for $NiFe_2O_4/ZrO_2$ core-shell nanoparticles in accordance with an illustrative aspect of the present disclosure.

3.2.2. $H_2$ Generation from $NiFe_2O_4/ZrO_2$ Core-Shell Nanoparticles $NiFe_2O_4/ZrO_2$ core-shell nanoparticles were loaded in an Inconel tubular loaded packed with raschig rings where regeneration and water splitting were performed at 1100° C. and 900° C. respectively. The average hydrogen yield for five thermochemical cycles was found to be 2.45 ml/g. The transient profiles for the hydrogen produced during five consecutive thermochemical cycles is pictorially illustrated in FIG. 24, where water splitting is performed at 900° C. using $NiFe_2O_4/(25\ wt\ \%)ZrO_2$ core-shell nanoparticles.

Figure 25:
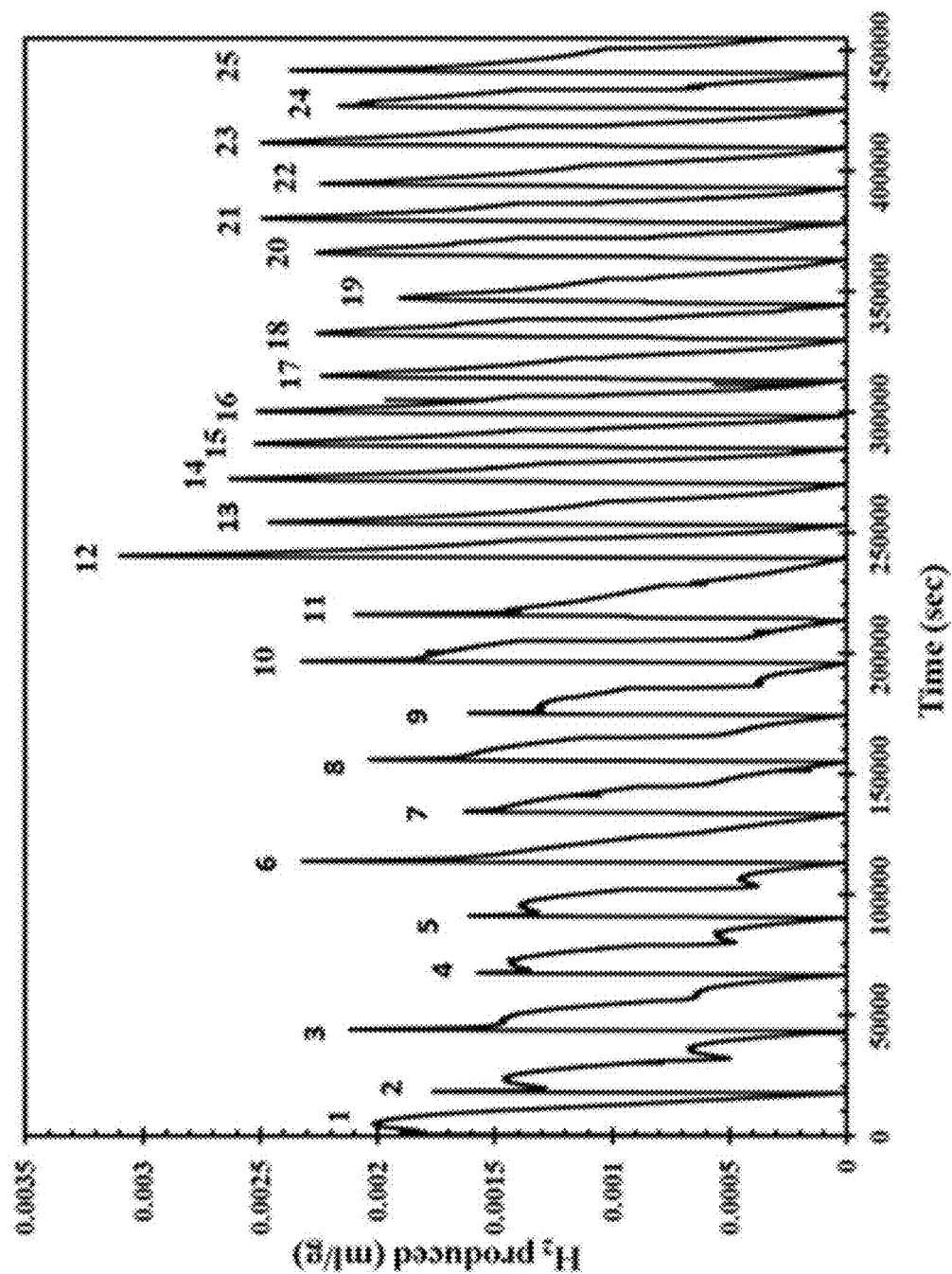
FIG. 25 is a pictorial representation of transient $H_2$ profiles obtained during 25 thermochemical cycles for yttrium iron garnet (YIG) in accordance with an illustrative aspect of the present disclosure.

3.2.3. $H_2$ Generation from Yttrium Ferrite or Yttrium Iron Garnet $Y_3Fe_5O_{12}$ was synthesized by sol-gel technique and utilized for hydrogen generation from thermochemical water-splitting where water-splitting and regeneration steps were performed at 1050° C. and 1150° C., respectively. Twenty-five consecutive thermochemical cycles were performed with a regeneration time of 3 hours at average $N_2$ flow of 55 SCCM during the water-splitting step. Transient $H_2$ profiles are presented in FIG. 25 where the transient $H_2$ profiles are obtained during 25 thermochemical cycles and water splitting is performed at 1150° C. using yttrium ferrite nanoparticles.

Similar $H_2$ volume is observed over 25 cycles indicating that thermal stabilization is achieved. The $O_2$ volume recorded during the regeneration step is found to be stabilized and in stoichiometry with the $H_2$ produced per thermochemical cycle respectively. The data for $H_2$ and $O_2$ volumes for twenty-five thermochemical cycles is recorded in Table 2.

TABLE 2

$H_2$ and $O_2$ volumes produced during 25 thermochemical cycles using yttrium ferrite.

| Cycle # | $H_2$ volume | $O_2$ volume | $H_2$ moles | $O_2$ moles | Mol Ratio |
|---|---|---|---|---|---|
| 1 | 23.8254 | 13.1929 | 0.000589 | 0.001062 | 1.80 |
| 2 | 23.5829 | 11.1170 | 0.000496 | 0.001052 | 2.12 |
| 3 | 21.7532 | 9.5158 | 0.000425 | 0.000970 | 2.28 |
| 4 | 20.7580 | 9.2310 | 0.000412 | 0.000926 | 2.25 |
| 5 | 18.4857 | 10.3645 | 0.000463 | 0.000824 | 1.78 |
| 6 | 18.3509 | 9.8550 | 0.000440 | 0.000818 | 1.86 |
| 7 | 17.9622 | 9.8798 | 0.000441 | 0.000801 | 1.82 |
| 8 | 17.5683 | 9.2772 | 0.000441 | 0.000783 | 1.78 |
| 9 | 16.9953 | 9.9149 | 0.000443 | 0.000758 | 1.71 |
| 10 | 19.0324 | 10.9976 | 0.000491 | 0.000849 | 1.73 |
| 11 | 19.5260 | 10.7478 | 0.000480 | 0.000871 | 1.81 |
| 12 | 18.8957 | 9.2610 | 0.000414 | 0.000843 | 2.04 |
| 13 | 17.6923 | 9.8961 | 0.000442 | 0.000789 | 1.79 |
| 14 | 18.3692 | 9.2416 | 0.000413 | 0.000789 | 1.91 |
| 15 | 16.9378 | 8.6540 | 0.000386 | 0.000755 | 1.96 |
| 16 | 16.9570 | 9.2767 | 0.000414 | 0.000756 | 1.83 |
| 17 | 17.7608 | 8.9073 | 0.000398 | 0.000792 | 1.99 |
| 18 | 16.5655 | 9.2638 | 0.000414 | 0.000739 | 1.79 |
| 19 | 17.3545 | 9.2774 | 0.000414 | 0.000774 | 1.87 |
| 20 | 17.8661 | 9.2733 | 0.000414 | 0.000797 | 1.93 |

TABLE 2-continued $H_2$ and $O_2$ volumes produced during 25 thermochemical cycles using yttrium ferrite.

| Cycle # | $H_2$ volume | $O_2$ volume | $H_2$ moles | $O_2$ moles | Mol Ratio |
|---|---|---|---|---|---|
| 21 | 17.2999 | 9.3153 | 0.000416 | 0.000771 | 1.85 |
| 22 | 17.4526 | 9.4468 | 0.000422 | 0.000778 | 1.84 |
| 23 | 18.2789 | 9.658 | 0.000431 | 0.000815 | 1.89 |
| 24 | 16.8682 | 9.2822 | 0.000415 | 0.000752 | 1.81 |
| 25 | 17.0237 | 9.2809 | 0.000414 | 0.000759 | 1.83 |
| Average | 18.5265 | 9.7646 | 0.000437 | 0.000825 | 1.89 |

Figure 26:
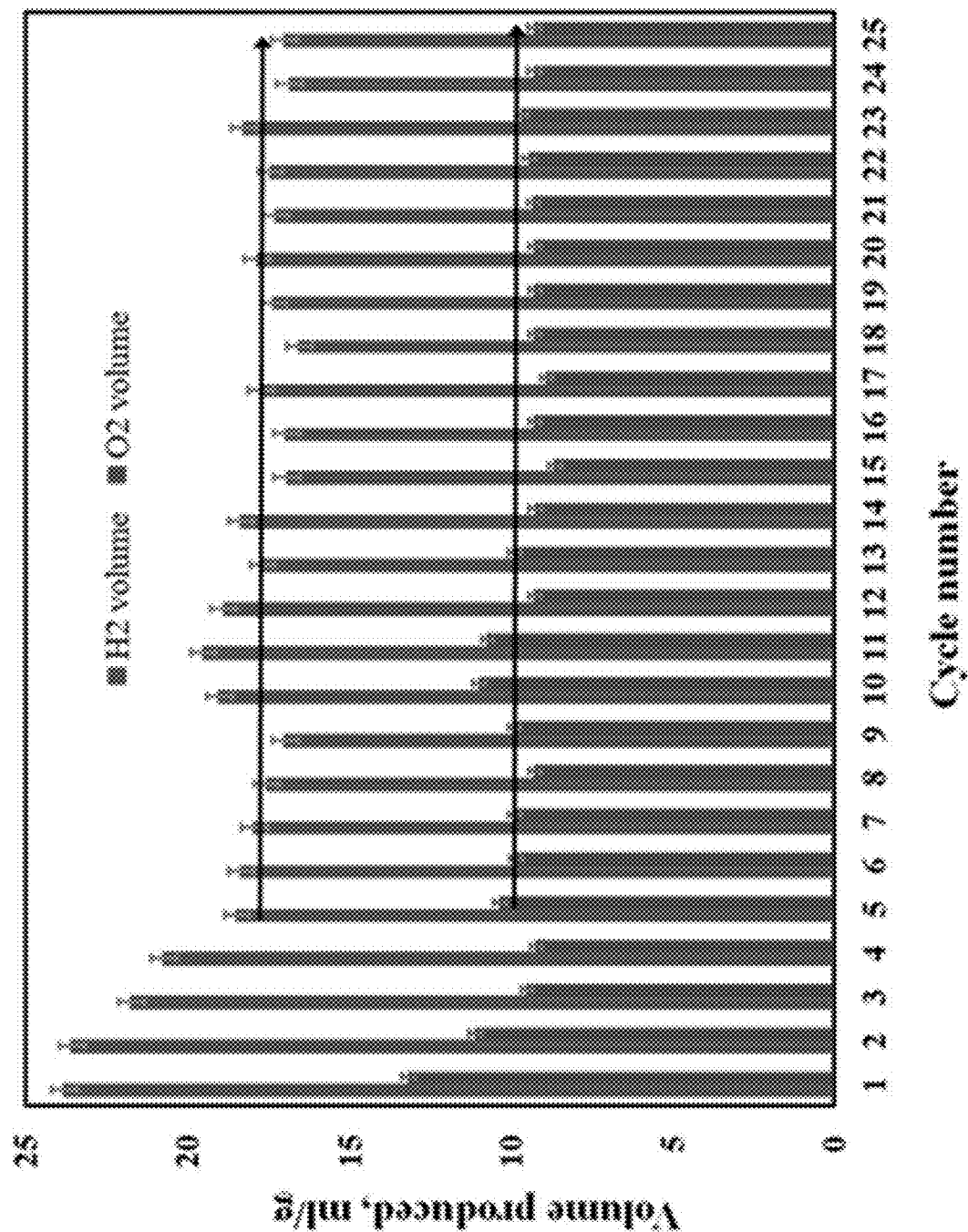
FIG. 26 is a pictorial representation of $H_2$ and $O2$ volume produced during 25 thermochemical cycles for yttrium ferrite nanoparticles in accordance with an illustrative aspect of the present disclosure.

$H_2$ and $O_2$ volume produced by yttrium ferrite is found to be stabilized from cycle 5 to cycle twenty-five. For example, $H_2$ and $O_2$ volume produced during twenty thermochemical cycles where regeneration and water-splitting steps were performed at 1100° C. and 1150° C. respectively under $N_2$ flow rate of 55 SCCM is shown in FIG. 26.

A similar trend for thermal stabilization is found when twenty-five thermochemical cycles is performed on $Y_3Fe_5O_{12}$ under isothermal regeneration and a water-splitting temperature of 1100° C. under a constant $N_2$ flow rate of 45 SCCM. The data for $H_2$ and $O_2$ volumes for 25 thermochemical cycles is recorded in Table 3.

TABLE 3

$H_2$ and $O_2$ volumes produced during 25 thermochemical cycles using yttrium ferrite under isothermal conditions.

| Cycle # | $H_2$ volume | $O_2$ volume | $H_2$ moles | $O_2$ moles | Mol Ratio |
|---|---|---|---|---|---|
| 1 | 49.2135 | 23.3692 | 0.002195 | 0.001044 | 2.10 |
| 2 | 10.0981 | 5.8170 | 0.000450 | 0.000260 | 1.73 |
| 3 | 10.3862 | 5.6258 | 0.000463 | 0.000251 | 1.84 |
| 4 | 9.2072 | 4.7310 | 0.000411 | 0.000211 | 1.94 |
| 5 | 9.8079 | 4.5565 | 0.000437 | 0.000203 | 2.15 |
| 6 | 11.8010 | 5.7290 | 0.000526 | 0.000256 | 2.06 |
| 7 | 8.5530 | 4.4280 | 0.000381 | 0.000198 | 1.93 |
| 8 | 8.3841 | 4.6880 | 0.000374 | 0.000209 | 1.79 |
| 9 | 10.1612 | 5.9650 | 0.000453 | 0.000266 | 1.70 |
| 10 | 8.7790 | 4.4412 | 0.000391 | 0.000198 | 1.97 |
| 11 | 9.7896 | 5.0709 | 0.000437 | 0.000226 | 1.93 |
| 12 | 9.7500 | 5.5583 | 0.000435 | 0.000248 | 1.75 |
| 13 | 9.5194 | 4.8175 | 0.000425 | 0.000215 | 1.97 |
| 14 | 10.7270 | 4.9588 | 0.000478 | 0.000221 | 2.16 |
| 15 | 9.2130 | 5.3437 | 0.000411 | 0.000239 | 1.72 |
| 16 | 12.6500 | 6.8250 | 0.000564 | 0.000305 | 1.85 |
| 17 | 8.3230 | 4.6187 | 0.000371 | 0.000206 | 1.80 |
| 18 | 12.9840 | 6.9103 | 0.000579 | 0.000309 | 1.88 |
| 19 | 8.0170 | 3.8243 | 0.000358 | 0.000171 | 2.09 |
| 20 | 9.1281 | 4.7093 | 0.000407 | 0.000210 | 1.94 |
| 21 | 9.9540 | 4.3994 | 0.000444 | 0.000196 | 2.26 |
| 22 | 9.6840 | 5.5993 | 0.000432 | 0.000250 | 1.73 |
| 23 | 10.2840 | 4.7100 | 0.000459 | 0.000210 | 2.18 |
| 24 | 9.6210 | 4.7548 | 0.000429 | 0.000212 | 2.02 |
| 25 | 10.5310 | 5.5324 | 0.000470 | 0.000247 | 1.90 |
| Average | 11.4627 | 5.8793 | 0.000511 | 0.000263 | 1.94 |

Figure 27:
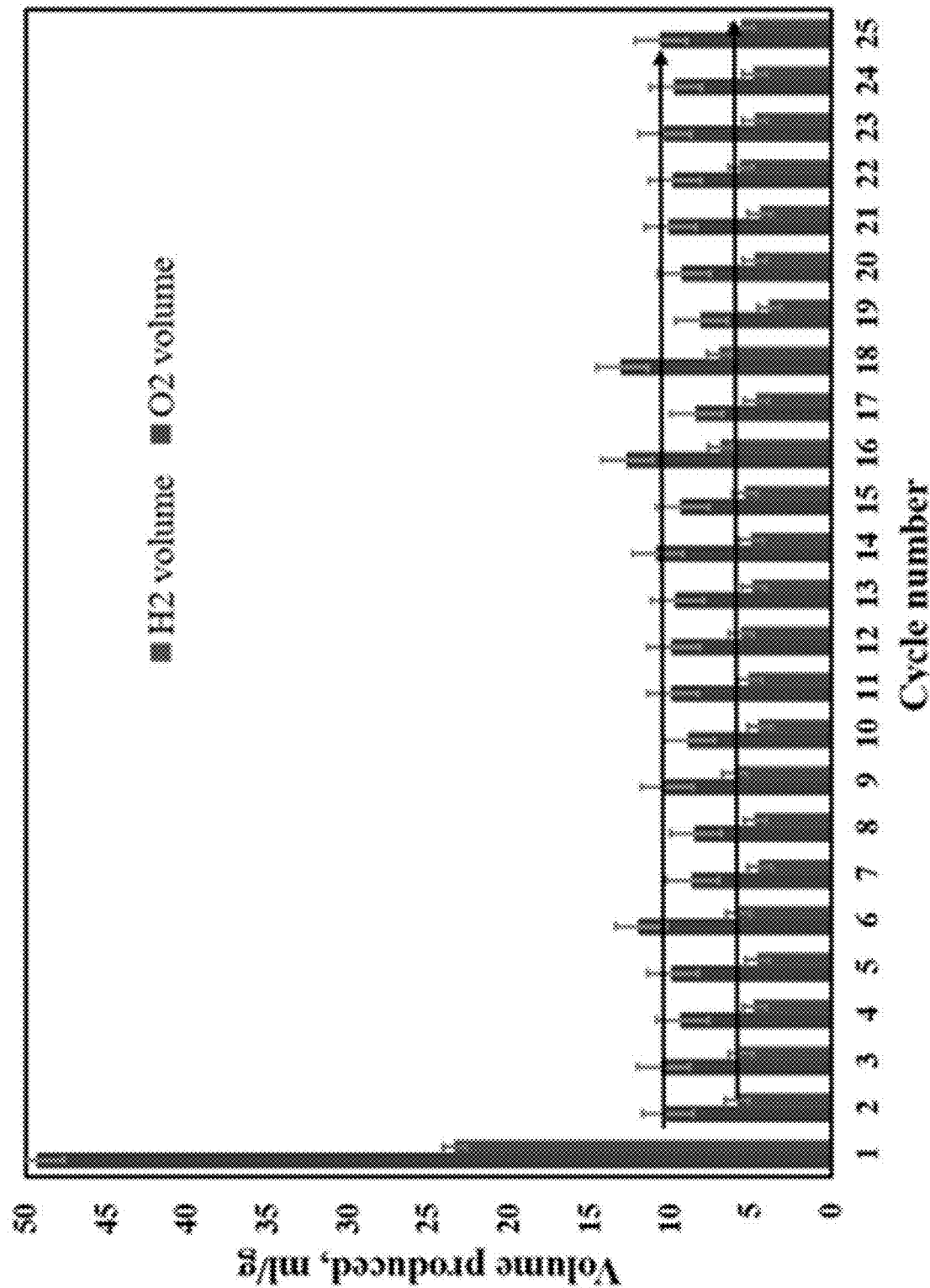
FIG. 27 is a pictorial representation of $H_2$ and $O2$ volume produced during 25 thermochemical cycles at isothermal condition for yttrium ferrite nanoparticles in accordance with an illustrative aspect of the present disclosure.

$H_2$ and $O_2$ volume produced by yttrium ferrite is found to be stabilized from cycle 2 to cycle twenty-five for $H_2$ and $O_2$ volume produced during eight thermochemical cycles where regeneration and the water-splitting steps are performed isothermally at 1100° C. under $N_2$ flow rate of 45 SCCM as shown in FIG. 27.

Magnetic measurements were also performed on different ferrite materials. FIGS. 7-10 show FORC measurements for the sol-gel derived Ni-ferrite material. The measurements were performed by Lake Shore AGM and provided us as preliminary results. Hysteresis M(H) and first-order-reversal-curves (FORC) are measured for each sample at ambient temperature using a Lake Shore MicroMag vibrating sample magnetometer (VSM). The FORC distribution function $\rho(H_a, H_b)$ is calculated from the measured FORC data, and is the mixed second derivative, i.e., $\rho(H_a, H_b) = -\partial^2 M(H_a, H_b)/\partial H_a \partial H_b$. The FORC diagram is a 2-D or 3-D contour plot of $\rho(H_a, H_b)$ with the axis rotated by changing coordinates from $(H_a, H_b)$ to $H_c=(H_b-H_a)/2$ and $H_u=(H_b+H_a)/2$, where $H_u$ represents the distribution of interaction fields, and He represents the distribution of switching or coercive fields. The raw data for measured M(H) and FORCs are presented in terms of magnetic moment (emu) versus applied magnetic field (Oe).

Figure 28:
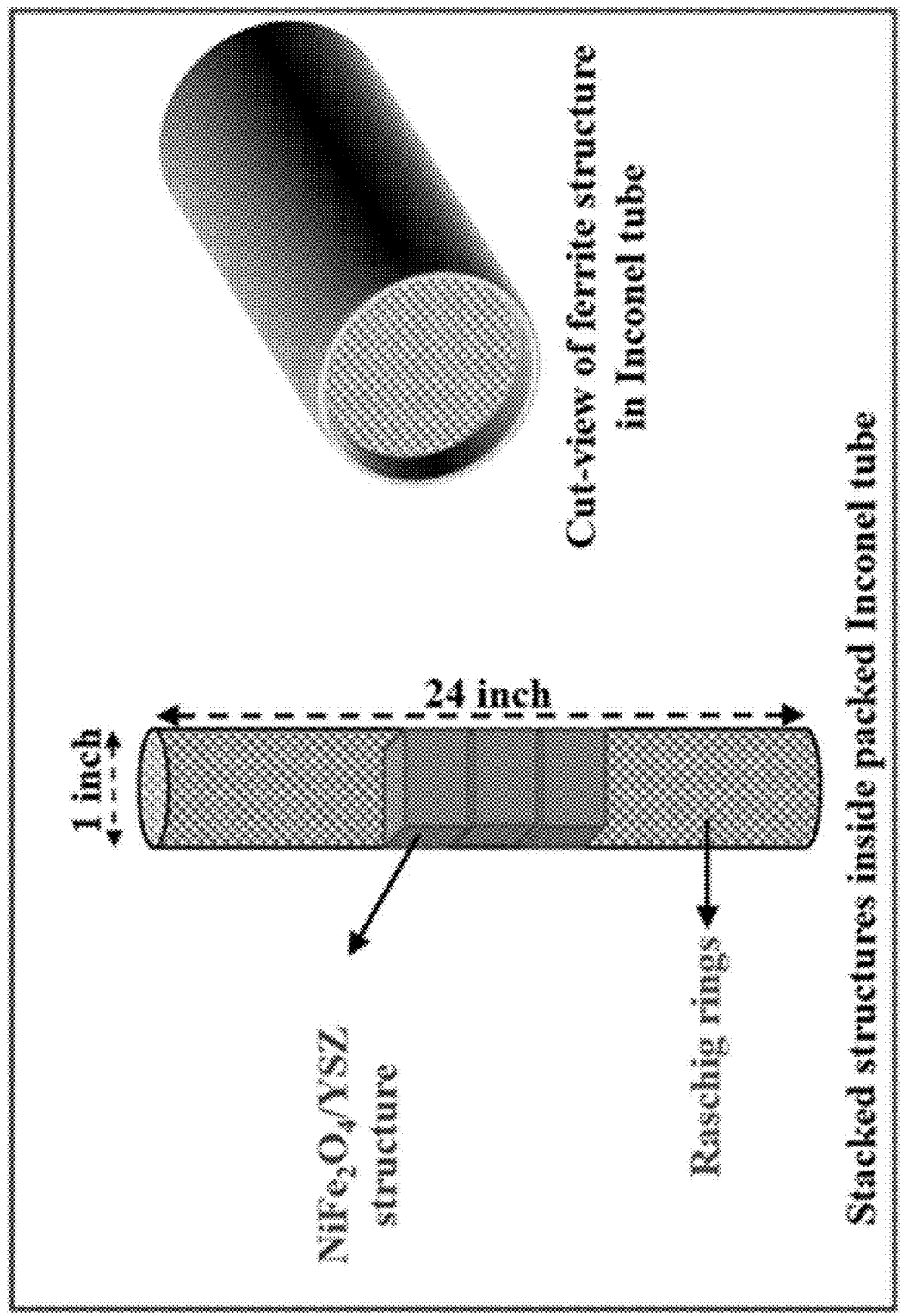
FIG. 28 is a pictorial representation of immobilized $NiFe_2O_4$/YSZ structures stacked inside the Inconel tubular reactor packed with raschig rings in accordance with an illustrative aspect of the present disclosure.

3.2.4. $H_2$ Generation from $NiFe_2O_4$ Immobilized into Porous Yttria Stabilized Zirconia (YSZ) Support Three identical $NiFe_2O_4$ immobilized ZYFB-6 structures can be stacked on the top of each other in an Inconel tubular reactor packed with the ceramic raschig rings as shown in the FIG. 28. Approximately twenty thermochemical cycles can be performed isothermally at 1100° C. under a constant $N_2$ flow rate of 35 SCCM. During the regeneration step, the ferrite immobilized structures can be heated for 3 hours where the oxygen released can be continuously monitored using an online $O_2$ sensor. The $H_2$ volume generated during the water-splitting step can be continuously monitored using the $H_2$ sensor (HY OPTIMA from H2Scan). The $H_2$ volume produced over multiple thermochemical cycles is found to be stabilized after 4 consecutive thermal cycles. During the $1^{st}$ cycle, very high $H_2$ volume of 442.72 mL/g of material is observed.

Figure 29:
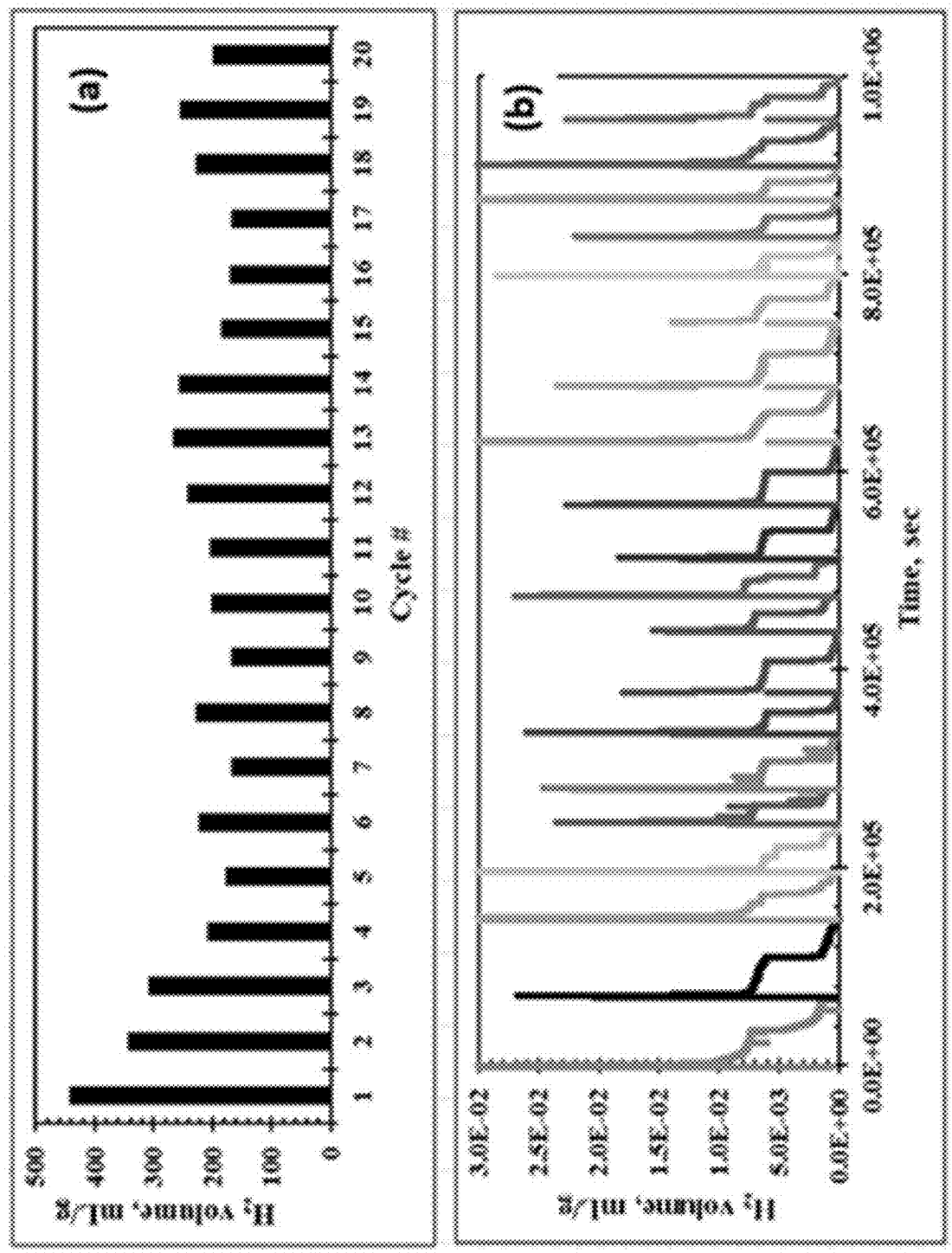
FIG. 29 is a pictorial representation of a) $H_2$ volume generated and b) transient $H_2$ profiles during 20 consecutive thermochemical cycles where water splitting and regeneration steps were performed at isothermal conditions of 1100° C. using immobilized $NiFe_2O_4$/YSZ structure in accordance with an illustrative aspect of the present disclosure.

The $H_2$ volume generated during 20 consecutive thermochemical cycles is shown in FIG. 29(a) whereas the transient $H_2$ volume generated is shown in FIG. 29(b). Overall during the 20 thermochemical cycles, a stable $H_2$ volume generation of avg. 231.26 mL/g/cycle is observed. $NiFe_2O_4$ immobilized into a porous ZYFB-6 structure appears to be more promising as compared with $NiFe_2O_4$ nanoparticles. $NiFe_2O_4$ nanoparticles present in the porous ZYBF-6 fibrous support appear to mitigate the grain growth during multiple thermochemical cycles. Thus, the porous ceramic support immobilized with redox nanoparticles is advantageous in mitigating the grain growth and preventing sintering thereby achieving stable $H_2$ volume over multiple thermochemical cycles.

4.0. Conclusions $H_2$ as a cleaner fuel can be efficiently generated from a thermochemical water-splitting process. This can be a two-step process where in one or more of the steps (regeneration), the redox material(s) are heated at higher temperatures of 900° C.-1600° C. that create oxygen vacancies. In another one of the steps (water-splitting), $H_2$ can be produced by scavenging the oxygen from the steam at lower temperatures of 700° C.-1400° C. Together these two steps can be referred to as one thermochemical cycle. It has been observed that during multiple thermochemical cycles at such high temperatures, thermal stresses are induced in the redox materials leading to particle sintering and grain growth. Consequently, the $H_2$ volume generated during a thermochemical water-splitting process decreases with an increase in thermochemical cycles. Relatively stable $H_2$ volume can be generated during multiple thermochemical cycling operation(s) by making use of thermally stabilized redox materials.

For example, by encapsulating the redox nanoparticles within a ceramic shell, a core-shell morphology can be created, which can inhibit the grain growth or particle sintering of ferrite nanoparticles especially at high temperatures. Thus, the thin-shell of a ceramic material can act as a physical barrier preventing grain growth of ferrite nanoparticles. Thus, an object, feature or advantage of the present disclosure is contained in a method, system and process for making use of core-shell redox materials relatively stable $H_2$ volume generated during a multiple thermochemical cycling operation. In the present disclosure, methods, systems and processes provide synthesis of core-shell nanoparticles such as Ni-ferrite/$Y_2O_3$, and Ni-ferrite/$ZrO_2$ via a surfactant templating assisted sol-gel method. More broadly, the methods, systems and processes of the present disclosure disclose $H_2$ generation via thermochemical water-splitting reaction using core-shell nanoparticles. As yttria does not undergo any phase transformations at high temperatures, yttrium iron garnet (YIG) is synthesized and its $H_2$ generation ability is disclosed. Thus, the present disclosure reports, in at least one exemplary implementation, the hydrogen generation ability of yttrium ferrite synthesized using a sol-gel technique.

For example, by immobilization of redox material into a porous ceramic support the particle sintering or grain growth can be mitigated. Thus, an object, feature or advantage of the present disclosure is contained in a method, system and process for making immobilized redox nanoparticles into a porous ceramic support producing relatively stable $H_2$ volume during a multiple thermochemical cycling operation.

LIST OF REFERENCES CITED

The following documents are cited in this application, and are incorporated herein in their entirety:

Gregory C. Stangle, Koththavasal R. Venkatachari, Steven. Ostrander, Walter A. Schulze, John D. Pietras, "Process for making ultra-fine yttrium-iron-garnet particles", U.S. Pat. No. 5,660,773 A, 26 Aug., 1997.

Grodkiewicz, William H., and G. Le Grand. "Growth of yttrium iron garnet." U.S. Pat. No. 3,386,799. 4 Jun. 1968.

Nemiroff, Michael, Hong Jun Yue, and William Russell Schevey. "Yttrium iron garnet disks on gadolinium gallium substrates for microwave applications." U.S. Pat. No. 4,060,448. 29 Nov. 1977.

Glass, Howard L., and Michael T. Elliott. "Method for controlling the resonance frequency of yttrium iron garnet films." U.S. Pat. No. 4,273,610. 16 Jun. 1981.

Sedlak, Burton, and Robert Blau. "Yttrium iron garnet preselectors." U.S. Pat. No. 3,299,376. 17 Jan. 1967.

Schiebold, Cristopher F., and William R. Green. "Controlled voltage yttrium iron garnet (YIG) resonator apparatus." U.S. Pat. No. 4,420,731. 13 Dec. 1983.

Kimura, Shigeyuki, et al. "Process for producing single crystal of yttrium-iron garnet or solid solution thereof" U.S. Pat. No. 4,256,531. 17 Mar. 1981.

Kotov Nicholas A, Liz-Marzan Luis M, "Thin films of core-shell nanoparticles", US Patent WO/2000/044507 A1, 3 Aug., 2000.

Rajendran, M., S. Deka, P. A. Joy, and A. K. Bhattacharya. "Size-dependent magnetic properties of nanocrystalline yttrium iron garnet powders." *Journal of magnetism and magnetic materials* 301, no. 1 (2006): 212-219.

Soleimani, Hassan, Zulkifly Abbas, Noorhana Yahya, Kamyar Shameli, Hojjatollah Soleimani, and Parvaneh Shabanzadeh. "Reflection and transmission coefficient of yttrium iron garnet filled polyvinylidene fluoride composite using rectangular waveguide at microwave frequencies." *International journal of molecular sciences* 13, no. 7 (2012): 8540-8548.

Abramova, Vera V., Alexander Slesarev, and Alexander Sinitskii. "Synthesis of high-quality inverse opals based on magnetic complex oxides: yttrium iron garnet ($Y_3Fe_5O_{12}$) and bismuth ferrite ($BiFeO_3$)." *Journal of Materials Chemistry C1*, no. 17 (2013): 2975-2982.

Zhang, Wei, Cuijing Guo, Rongjin Ji, Caixiang Fang, and Yanwei Zeng. "Low-temperature synthesis and microstructure-property study of single-phase yttrium iron garnet (YIG) nanocrystals via a rapid chemical coprecipitation." *Materials Chemistry and Physics* 125, no. 3 (2011): 646-651.

Pinkas, Jiri, Vendula Reichlova, Aneta Serafimidisova, Zdenek Moravec, Radek Zboril, Dalibor Jancik, and Petr Bezdicka. "Sonochemical synthesis of amorphous yttrium iron oxides embedded in acetate matrix and their controlled thermal crystallization toward garnet ($Y_3Fe_5O_{12}$) and perovskite ($YFeO_3$) nanostructures." *The Journal of Physical Chemistry C* 114, no. 32 (2010): 13557-13564.

Labuayai, Sarawuth, Sineenat Siri, and Santi Maensiri. "Synthesis of Yttrium Iron Garnet ($Y_3Fe_5O_{12}$) nanopowders by a simple proteic sol-gel process." *Journal of Optoelectronics and Advanced Materials* 10, no. 10 (2008): 2694-2699.

Garskaite, E., K. Gibson, A. Leleckaite, J. Glaser, D. Niznansky, A. Kareiva, and H-J. Meyer. "On the synthesis and characterization of iron-containing garnets ($Y_3Fe_5O_{12}$, YIG and $Fe_3Al_5O_{12}$, IAG)." *Chemical physics* 323, no. 2 (2006): 204-210.

Vajargah, S. Hosseini, HR Madaah Hosseini, and Z. A. Nemati. "Synthesis of nanocrystalline yttrium iron garnets by sol-gel combustion process: The influence of pH of precursor solution." *Materials Science and Engineering: B* 129, no. 1 (2006): 211-215.

Mingiang, Wang, Zhu Xiangying, Wei Xiaoyong, Zhang Liangying, and Yao Xi. "Preparation and annealing process of $Y_3Fe_5O_{12}$ by sol-gel method." *Ferroelectrics* 264, no. 1 (2001): 249-254.

Vaqueiro, P., and M. A. Lopez-Quintela. "Influence of complexing agents and pH on yttrium-iron garnet synthesized by the sol-gel method." *Chemistry of materials* 9, no. 12 (1997): 2836-2841.

Patron, Luminita, Oana Carp, Ioana Mindru, Gabriela Marinescu, Nicolae Stanica, and loan Balint. "Polynuclear coordination precursors compounds for M3Fe5O12 garnets (M=Y, Eu, Gd and Er), Part I: Synthesis of the precursors." *Journal of the Serbian Chemical Society* 70, no. 8-9 (2005): 1049-1056.

C. Agrafiotis et al., Solar water splitting for hydrogen production with monolithic reactors. Solar Energy 79, 409-421 (2005).

M. Roeb et al., in Proceedings of the 16th World Hydrogen Energy Conference, Lyon, France, June. (2006), pp. 13-16.

M. Neises-von Puttkamer et al., Material Analysis of Coated Siliconized Silicon Carbide (SiSiC) Honeycomb Structures for Thermochemical Hydrogen Production. Materials 6, 421-436 (2013).

N. Gokon, H. Murayama, A. Nagasaki, T. Kodama, Thermochemical two-step water splitting cycles by monoclinic $ZrO_2$-supported $NiFe_2O_4$ and $Fe_3O_4$ powders and ceramic foam devices. Solar Energy 83, 527-537 (2009).

S. Kawakami et al., Thermochemical two-step water splitting cycle using Ni-ferrite and $CeO_2$ coated ceramic foam devices by concentrated Xe-light radiation. Energy Procedia 49, 1980-1989 (2014).

What is claimed is:

1. A method for forming core-shell nanoparticles for $H_2$ volume generation, comprising:
   obtaining $NiCl_2$ and $FeCl_2$ precursors;
   dispersing the $NiCl_2$ and $FeCl_2$ precursors in ethanol to form a precursor dispersion after obtaining the $NiCl_2$ and $FeCl_2$ precursors;
   sonicating the precursor dispersion;
   forming a gel from the precursor dispersion to form gel derived Ni-ferrite nanoparticles after sonicating the precursor dispersion;
   calcinating the gel derived ferrite nanoparticles to form sol-gel derived Ni-ferrite nanoparticles;
   dispersing the sol-gel derived Ni-ferrite nanoparticles in surfactant thereby forming a first dispersion, wherein the sol-gel derived Ni-ferrite nanoparticles have an inverse spinel structure, wherein the surfactant comprises isopropanol and pluronic 123;
   sonicating the first dispersion;
   adding a copolymer surfactant to the first dispersion after sonicating the first dispersion;
   forming a composition by introducing the first dispersion into a second dispersion after adding the copolymer surfactant, the second dispersion comprising a surfactant and a precursor of Zr, wherein the Zr precursor comprises Zr isopropoxide in at least isopropanol;
   sonicating the composition;
   increasing the viscosity of the composition after sonicating the composition to form a gel by adding at least one or more organic compounds;
   adding deionized water to the composition;
   aging the composition for a time period;
   calcining the composition at a first ramp up temperature between 25° C.-150° C. for a first time period and at a second ramp up temperature between 150° C.-800° C. for a second time period while aging the composition for forming the core-shell nanoparticles after increasing the viscosity of the composition, wherein a shell of the core-shell nanoparticles comprises a uniform amorphous shell, wherein the shell is in a tetragonal phase.

2. The method of claim 1 wherein the core-shell inhibits grain growth and particle sintering of the core-shell nanoparticles.

3. The method of claim 1 wherein the core-shell nanoparticles comprise nanoparticles $NiFe_2O_4/ZrO_2$, wherein the amount of $ZrO_2$ is 25 wt %.

4. The method of claim 3 wherein the calcining comprises using a calcining process of at least 300° C.-800° C. at 5° C./min for the second time period.

5. The method of claim 4 further comprising:
   providing a thermochemical water-splitting reactor.

6. The method of claim 5 further comprising:
   loading the $NiFe_2O_4/ZrO_2$ nanoparticles into a tubular thermochemical water-splitting reactor packed with raschig rings and performing a regeneration step and a water splitting step at least at 1100° C. and 900° C. respectively to generate $H_2$.

7. The method of claim 1 wherein the calcining comprises using a calcining process of at least 25° C.-150° C. for the first ramp up temperature at 2° C./min for the first time period, 150° C.-300° C. for the second ramp up temperature at 3° C./min for the second time period, and 300° C.-800° C. for a third ramp up temperature at 5° C./min for a third time period.

8. A method for $H_2$ volume generation, consisting of:
   dispersing $NiCl_2$ and $FeCl_2$ precursors in ethanol to form a precursor dispersion;

forming a gel from the precursor dispersion to form gel derived Ni-ferrite nanoparticles after the ethanol is added;

preheating the gel;

calcinating the gel derived Ni-ferrite nanoparticles to form sol-gel derived Ni-ferrite nanoparticles;

molding a toroidal shape from the core-shell-nanoparticles;

dispersing the molded Ni-ferrite nanoparticles in a non-ionic surfactant mixed with ethanol thereby forming a first dispersion;

forming a composition by introducing the first dispersion into a second dispersion, the second dispersion comprising a surfactant and a precursor of a ceramic Zr, wherein the Zr precursor comprises Zr isopropoxide in isopropanol;

sonicating the composition;

adding water to the composition to form a gel composition after sonicating the composition;

aging the gel composition;

calcining the gel composition at two or more ramp up temperatures while aging the gel composition to produce $NiFe_2O_4/ZrO_2$ core-shell nanoparticles, wherein a shell of the $NiFe_2O_4/ZrO_2$ core-shell nanoparticles is in a tetragonal phase;

introducing the $NiFe_2O_4/ZrO_2$ core-shell nanoparticles into a thermochemical water-splitting reactor;

introducing steam to the thermochemical water-splitting reactor after introducing the $NiFe_2O_4/ZrO_2$ core-shell nanoparticles; and generating $H_2$ from the $NiFe_2O_4/ZrO_2$ core-shell nanoparticles and the steam in the thermochemical water-splitting reactor, wherein the $H_2$ is generated during at least one thermochemical cycle.

9. The method of claim 8, wherein the calcining the gel composition to produce $NiFe_2O_4/ZrO_2$ core-shell nanoparticles comprises using a calcining process of a first calcining at 25° C.-150° C. at 2° C./min, a second calcining at 150° C.-300° C. at 3° C./min and a third calcining 300° C.-800° C. at 5° C./min.

10. The method of claim 8, wherein the $NiFe_2O_4/ZrO_2$ core-shell nanoparticles comprise a coating of one or more electrically conductive materials.

11. The method of claim 8, wherein the $NiFe_2O_4/ZrO_2$ nanoparticles are loaded into the thermochemical water-splitting reactor packed with raschig rings.

12. The method of claim 11, further comprising performing a regeneration step and a water splitting step at least at 1100° C. and 900° C. respectively.

13. The method of claim 8, further comprising yielding at least 2.45 mL of $H_2$ per gram of $NiFe_2O_4/ZrO_2$ from five thermochemical cycles.

14. The method of claim 8 wherein $N_2$ is a carrying gas within the thermochemical water-splitting reactor.

15. The method of claim 8, wherein the amount of $ZrO_2$ in $NiFe_2O_4/ZrO_2$ is 25 wt %.

* * * * *